United States Patent
Kadaba

(10) Patent No.: US 8,712,922 B2
(45) Date of Patent: *Apr. 29, 2014

(54) COMPUTER SYSTEM FOR ROUTING PACKAGE DELIVERIES

(75) Inventor: Nagesh Kadaba, Roswell, GA (US)

(73) Assignee: United Parcel Service of America, Inc.

(*) Notice: Subject to any disclaimer, the term of this patent is extended or adjusted under 35 U.S.C. 154(b) by 14 days.

This patent is subject to a terminal disclaimer.

(21) Appl. No.: 13/019,715

(22) Filed: Feb. 2, 2011

(65) Prior Publication Data

US 2011/0125664 A1 May 26, 2011

Related U.S. Application Data

(60) Continuation of application No. 12/771,639, filed on Apr. 30, 2010, which is a division of application No. 10/807,679, filed on Mar. 24, 2004, now Pat. No. 7,739,202.

(60) Provisional application No. 60/464,529, filed on Apr. 22, 2003.

(51) Int. Cl.
*G06Q 10/00* (2012.01)
*G06Q 50/00* (2012.01)

(52) U.S. Cl.
USPC .................. 705/333; 705/332; 705/338

(58) Field of Classification Search
USPC .................................. 705/330–341
See application file for complete search history.

(56) References Cited

U.S. PATENT DOCUMENTS

| | | | |
|---|---|---|---|
| 4,167,476 | A | 9/1979 | Jackson |
| 4,832,204 | A | 5/1989 | Handy et al. |
| 5,008,827 | A | 4/1991 | Sansone et al. |
| 5,043,908 | A | 8/1991 | Manduley et al. |
| 5,051,914 | A | 9/1991 | Sansone et al. |
| 5,068,797 | A | 11/1991 | Sansone et al. |
| 5,770,841 | A | 6/1998 | Moed et al. |
| 5,774,885 | A | 6/1998 | Delfer |
| 5,971,587 | A | 10/1999 | Kato |
| 6,035,291 | A | 3/2000 | Thiel |
| 6,195,174 | B1 | 2/2001 | Johnson et al. |
| 6,241,099 | B1 | 6/2001 | Hendrickson et al. |
| 6,285,916 | B1 | 9/2001 | Kadaba et al. |
| 6,510,992 | B2 | 1/2003 | Wells et al. |

(Continued)

FOREIGN PATENT DOCUMENTS

| | | |
|---|---|---|
| EP | 0 424 728 A2 | 5/1991 |
| WO | WO 00/00300 | 6/1999 |

(Continued)

OTHER PUBLICATIONS

Hill, Parcelcall: Intelligent tracking for transport and logistics, Information Society Technologies, Oct. 2002.*

(Continued)

*Primary Examiner* — Daniel Vetter
(74) *Attorney, Agent, or Firm* — Alston & Bird LLP

(57) ABSTRACT

A shipping system for shipping packages involving the coordinated use of at least a first carrier and a second carrier. The shipping system includes physical delivery facilities for the physical delivery of packages, the physical delivery facilities including at least one transfer location at which the second carrier may take over delivery responsibilities for a package.

24 Claims, 13 Drawing Sheets

(56) References Cited

U.S. PATENT DOCUMENTS

| | | |
|---|---|---|
| 6,539,360 B1 | 3/2003 | Kadaba |
| 6,610,955 B2 | 8/2003 | Lopez |
| 6,674,038 B1 | 1/2004 | Latta |
| 6,772,130 B1 | 8/2004 | Karbowski et al. |
| 6,873,963 B1 | 3/2005 | Westbury et al. |
| 6,959,292 B1 | 10/2005 | Pintsov |
| 6,961,711 B1 | 11/2005 | Chee |
| 6,978,929 B2 | 12/2005 | Buie et al. |
| 7,028,895 B2 | 4/2006 | Ashaari |
| 7,031,959 B2 | 4/2006 | Garner et al. |
| 7,035,856 B1 | 4/2006 | Morimoto |
| 7,117,170 B1 | 10/2006 | Bennett et al. |
| 7,376,598 B2 | 5/2008 | Estes et al. |
| 7,647,231 B2 | 1/2010 | Kuebert et al. |
| 7,693,723 B2 | 4/2010 | Wade |
| 7,769,778 B2 | 8/2010 | Snapp et al. |
| 7,848,961 B2 | 12/2010 | Estes et al. |
| 7,984,289 B2 | 7/2011 | Orbke et al. |
| 8,036,993 B2 | 10/2011 | Estes |
| 8,103,521 B2 | 1/2012 | Kuebert et al. |
| 8,103,716 B2 | 1/2012 | Boyce et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,291,234 B2 | 10/2012 | Snapp et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 2002/0016726 A1 | 2/2002 | Ross |
| 2002/0032573 A1 | 3/2002 | Williams et al. |
| 2002/0032643 A1 | 3/2002 | Himmelstein |
| 2002/0053533 A1 | 5/2002 | Brehm |
| 2002/0069186 A1 | 6/2002 | Moore |
| 2002/0077847 A1 | 6/2002 | Thiel |
| 2002/0123911 A1 | 9/2002 | Bjerre et al. |
| 2002/0152174 A1 | 10/2002 | Woods et al. |
| 2002/0156645 A1 | 10/2002 | Hansen |
| 2002/0178239 A1 | 11/2002 | Kinyon et al. |
| 2003/0003936 A1 | 1/2003 | Tighe |
| 2003/0009351 A1 | 1/2003 | Wade |
| 2003/0014375 A1 | 1/2003 | Hoffmann et al. |
| 2003/0093389 A1 | 5/2003 | Critelli et al. |
| 2003/0105704 A1 | 6/2003 | Sundel |
| 2003/0195784 A1 | 10/2003 | Smith, Jr. |
| 2003/0200113 A1 | 10/2003 | Latta |
| 2003/0212631 A1 | 11/2003 | Foth et al. |
| 2003/0236688 A1 | 12/2003 | Kadaba et al. |
| 2004/0054552 A1 | 3/2004 | Amonette et al. |
| 2004/0064326 A1 | 4/2004 | Nino Vaghi |
| 2004/0083189 A1 | 4/2004 | Leon |
| 2004/0083228 A1 | 4/2004 | Rainey et al. |
| 2004/0093312 A1 | 5/2004 | Cordery et al. |
| 2004/0098355 A1 | 5/2004 | Biasi |
| 2004/0188522 A1 | 9/2004 | Ashaari Shahpour |
| 2004/0193438 A1 | 9/2004 | Stashluk et al. |
| 2005/0149373 A1 | 7/2005 | Amling et al. |
| 2007/0150533 A1 | 6/2007 | Krause et al. |
| 2008/0133261 A1 | 6/2008 | Ray |
| 2008/0172305 A1 | 7/2008 | Estes et al. |
| 2008/0221913 A1 | 9/2008 | Cook et al. |
| 2008/0319970 A1 | 12/2008 | Garner et al. |
| 2008/0320092 A1 | 12/2008 | Campbell et al. |
| 2009/0046892 A1 | 2/2009 | Avant et al. |
| 2009/0138730 A1 | 5/2009 | Cook et al. |
| 2009/0173672 A1 | 7/2009 | Avant et al. |
| 2010/0100497 A1 | 4/2010 | Kuebert et al. |
| 2010/0185565 A1 | 7/2010 | Wade |
| 2012/0179622 A1 | 7/2012 | Amato |
| 2012/0310853 A1 | 12/2012 | Aldstadt |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |

FOREIGN PATENT DOCUMENTS

| | | |
|---|---|---|
| WO | WO 01/59697 A1 | 8/2001 |
| WO | WO 02/058308 | 7/2002 |
| WO | WO 02/101505 A2 | 12/2002 |
| WO | WO 03019333 | 3/2003 |

OTHER PUBLICATIONS

Jakobs, et al., An Integrated Approach Towards Next Generation Tracking & Tracing, Proc. 10th Intl. Conf. on Mgmt. of Tech., IAMOT, 2001.*

Crew, et al., Balancing Access and the Universal Service Obligation, Postal and Delivery Services: Delivering on Competition, Kluwer, 2002, pp. 3-32.*

Crew, et al., Managing Change in the Postal and Delivery Industries, Springer, 1997, pp. 235-318, 387-424.*

Office Action from U.S. Appl. No. 12/771,639 mailed May 31, 2011.

Office Action for U.S. Appl. No. 12/900,739, dated Apr. 27, 2012.

Office Action dated Feb. 29, 2012 for U.S. Appl. No. 13/019,727, filed Feb. 2, 2011.

Canadian Office Action dated Feb. 10, 2012, for Canadian Application No. 2,523,453.

Canadian Office Action dated Mar. 14, 2012, for Canadian Application No. 2,589,506.

United States Patent and Trademark Office, Office Action for U.S. Appl. No. 12/900,739, dated Aug. 2, 2012, 14 pages, USA.

United States Patent and Trademark Office, Office Action for U.S. Appl. No. 13/019,727, dated Jun. 12, 2012, 11 pages, USA.

United States Patent and Trademark Office, Office Action for U.S. Appl. No. 12/771,639, dated Jan. 18, 2013, 20 pages, USA.

United States Patent and Trademark Office, Office Action for U.S. Appl. No. 12/900,739, dated Jan. 18, 2013, 13 pages, USA.

United States Patent and Trademark Office, Office Action for U.S. Appl. No. 13/019,727, dated Feb. 1, 2013, 9 pages, USA.

United States Patent and Trademark Office, Office Action for U.S. Appl. No. 12/771,639, dated May 16, 2013, 23 pages, USA.

United States Patent and Trademark Office, Office Action for U.S. Appl. No. 12/900,739, dated May 17, 2013, 16 pages, USA.

United States Patent and Trademark Office, Office Action for U.S. Appl. No. 13/019,727, dated May 17, 2013, 12 pages, USA.

United States Patent and Trademark Office, Office Action for U.S. Appl. No. 12/771,639, Nov. 7, 2013, 22 pages, USA.

United States Patent and Trademark Office, Office Action for U.S. Appl. No. 13/019,727, Nov. 20, 2013, 12 pages, USA.

United States Patent and Trademark Office, Office Action for U.S. Appl. No. 12/900,739, Nov. 21, 2013, 16 pages, USA.

Connor, M.; *UPS FedEx Turn to US Post Agency to Test Services*, Reuters, 2 pages, dated Nov. 6, 2003.

Weber, H., *UPS to Test Service for Direct Marketers*, Associated Press, 2 pages, dated Nov. 6, 2003.

*UPS Turns to Postal Service*, CNN Money, 2 pages, available at http://www.cnnmoney.com; article dated Nov. 6, 2003; downloaded Nov. 11, 2003.

*FedEx, UPS turn to Postal Service*, Memphis Business Journal, 1 page, available at http://memphis.bizjournals.com/memphis/stories/2003/11/03/daily33.html; dated Nov. 6, 2003; downloaded Nov. 11, 2003.

*UPS, FedEx turn to U.S. Post Office*, The Journal of Commerce Online, 1 page, available at www.joc.com; dated Nov. 6, 2003; downloaded Nov. 11, 2003.

*UPS: US United Parcel Service Inc.*, Bloomberg, 3 pages, available at www.bloomberg.com; dated Nov. 7, 2003, downloaded Nov. 11, 2003.

Mongelluzzo, B.; *Shipping Act Change Coming, But Only for UPS, FedEx*? Journal of Commerce Online, 2 pages, available at 222.joc.com; dated Nov. 4, 2003.

Brooks, R.; *New UPS Delivery Service Sends Packages Through the Post Office*, The Wall Street Journal, 3 pages, dated Nov. 6, 2003.

(56) References Cited

OTHER PUBLICATIONS

Office Action dated Oct. 30, 2008, U.S. Appl. No. 10/999,558, filed Nov. 30, 2004.

PCT Notification of Transmittal of the International Search Report and the Written Opinion of The International Searching Authority, or the Declaration, mailed May 12, 2006 for PCT/US2005/043400 (Filed Nov. 29, 2005.

*Zone Skipping*; Parcel Direct; 2 pages found at http://www.parceldirect.com/our_approach/zone_skipping.asp (which dates back to Oct. 24, 2001) which were the search results from http://www.waybackmachine.org/.

Technology; Parcel Direct; 1 page, available at http://www.parceldirect.com/our_approach/technology_more.asp; originated Aug. 12, 2002; downloaded Jun. 16, 2005.

*Process Demo-Pick-up, Induction, Scanning, Sortation, Bed Loading, Palletization, Staging and Delivery*; Parcel Direct; 9 pages, available at http://www.parceldirect.com/our_approach/process.asp; originated Aug. 4, 2002; downloaded Jun. 16, 2005.

PCT Notification of Transmittal of the International Search Report and Written Opinion of the International Searching Authority, or the Declaration, mailed Nov. 22, 2004 for PCT/US2004/012610 (Filed Apr. 22, 2004).

Richardson, Small Shipments Reach Further with Technology, Transportation & Distribution, vol. 31, No. 4, p. 14 (Dialog copy), Apr. 1990.

Cohen, et al., The Cost of Universal Service in the U.S. and its Impact on Competition, Office of Rates, Analysis and Planning, U.S. Postal Rate Commission, Nov. 17, 2002.

Office Action dated Sep. 9, 2010 of corresponding U.S. Appl. No. 12/771,639, filed Apr. 30, 2010.

Office Action, dated Oct. 26, 2010, of corresponding Canadian Application No. 2,523,453.

Office Action, dated Dec. 29, 2010, of related U.S. Appl. No. 12/771,639, filed Apr. 30, 2010.

Heller, Christian, "*Tracking & tracing in combined road/rail freight transport*," IPTS Technical Report Series, Mar. 1999, pp. 1-135.

US Office Action from corresponding U.S. Appl. No. 10/999,558 dated Jan. 24, 2008.

Office Action dated Dec. 24, 2008, for U.S. Appl. No. 10/807,679, filed Mar. 24, 2004.

US Office Action from corresponding U.S. Appl. No. 10/999,558 dated Jun. 16, 2008.

US Office Action from corresponding U.S. Appl. No. 10/999,558 dated Apr. 22, 2009.

US Office Action from corresponding U.S. Appl. No. 10/807,679 dated Dec. 24, 2008.

US Office Action from corresponding U.S. Appl. No. 10/807,679 dated Jul. 1, 2008.

* cited by examiner

COMPUTER SYSTEM FOR ROUTING PACKAGE DELIVERIES

CROSS-REFERENCE TO RELATED APPLICATIONS

This application is a continuation of U.S. application Ser. No. 12/771,639 filed Apr. 30, 2010, which is a divisional application of U.S. application Ser. No. 10/807,679 filed Mar. 24, 2004, now U.S. Pat. No. 7,739,202 which claims priority to U.S. application Ser. No. 60/464,529 filed Apr. 22, 2003, all which are hereby incorporated herein in their entirety by reference.

BACKGROUND

1. Field of the Invention

Embodiments of the present invention are related to systems for coordinating the efforts of multiple carriers to ship packages, and in particular relates to electronic systems for coordinating such shipments using tracking, billing and other information.

2. Description of Related Art

As the amount of commerce conducted by mail increases yearly, significant efforts have been made to reduce the cost of shipping mail, such as letters and packages. In one instance, the U.S. Postal Service (USPS) offers a substantial reduction in rates to a shipper, provided that the shipper complies with certain requirements that allow the USPS to reduce its workload. Generally, delivery of mail entirely by the USPS requires collection, sorting and then distribution of each of the mail pieces. Reducing the workload of the USPS can therefore be aided by preprocessing of the mail pieces. For bulk mail, the USPS will accept delivery from a shipper along with certified documentation of the preprocessing results, such as by pre-sorting the mail pieces. Certification is via a manifest that is provided to the USPS and is representative of a group of the preprocessed documents.

Preprocessing for other mail services, and in particular non-bulk mail services wherein the mail pieces are not homogenous, requires more sophisticated forms of communication with the USPS. For instance, the preprocessing facilities may include computerized scales for determining the weight of each mail piece, metering devices for determining the postage amounts corresponding to the mail piece weights and marking devices for placing certification stamps on the mail piece. Each of these devices can be connected to the USPS via a telephone link that allows the USPS to interrogate the devices.

Interrogation allows the USPS systems to periodically determine the status of the equipment, including maintenance and usage rates. Such inquires allow the USPS to ensure that the equipment is giving an accurate accounting of the mail that is weighed, metered, marked and submitted to its facilities for further delivery. The telephone link may also allow the preprocessor to check on the progress of a particular piece of mail using an electronic inquiry of the USPS system. Typically, the progress check involves the use of bar coding, or some other unique identifying characteristic, placed on the mail piece by the marking devices. The bar coding can then be tracked by the USPS system at the conclusion of delivery of the mail piece by scanning the barcode on the mail piece and recording its delivery in a database.

A disadvantage of the above-described system is that the equipment and scale required for preprocessing of the mail pieces are too expensive for some shippers, especially when shipping to residential addresses. As a solution to this problem, intermediary entities have established cooperative relationships with the USPS to provide discounted shipping services.

Generally, the services provided by the intermediary include weighing of the mail pieces (packages) submitted by the shipper, labeling of the packages, sorting of the packages and submitting sorted groups of the packages to the appropriate local USPS facility. The USPS then makes the final delivery to the recipient addresses. In this manner, the intermediary can efficiently deal with the front end processes and receive the USPS discount (which is typically partially passed on to the customer) and ensure delivery without the expense of a large infrastructure for comprehensive delivery coverage including rural and residential delivery. Although the above-illustrated combined system advantageously provides cost-savings for shippers unwilling or unable to invest in preprocessing facilities, efforts at reducing the cost of shipping are continually ongoing.

Therefore, it would be advantageous to have an improved, cost-effective system for delivering packages and other mail to all known addresses. It would be further advantageous if such a system were a combined system that facilitates cooperation between multiples carriers (such as between a private carrier and the USPS) to take advantages of the strengths of each of the carriers.

BRIEF SUMMARY

Various embodiments of the present invention address the above needs and achieve other advantages by providing a shipping system for shipping packages involving the coordinated use of at least a first carrier and a second carrier. The shipping system includes physical delivery facilities for the physical delivery of packages, the physical delivery facilities including at least one transfer location at which the second carrier may take over delivery responsibilities for a package. The shipping system also includes an information system having a shipper computer system configured to record and determine whether the delivery address of a package is an efficient destination for the first carrier. If not an efficient destination, such as a delivery address having a rural zip code, the shipper computer system is configured to label the package for delivery to one of the transfer locations, allowing the first carrier to transfer the selected package to the second carrier for completion of the less efficient portion of the delivery.

In one embodiment, an aspect of the present invention is a system and method for deciding whether to offer combined carrier delivery service based on a determination of the cost to one carrier of making a delivery without assistance from another carrier. A basic criterion affecting cost may preferably be the recipient's geographical location, but can be any other type of criterion that affects the cost of delivery. Furthermore, secondary criteria for determining whether to offer a combined service to a geographical region (such as a zip code area) may vary according to a characteristic of the shipper, the nature of the product or item being shipped, the season of the year, and other factors.

Optionally, the information system may also include a first carrier computer system configured to obtain package information from the shipper computer system and correlating the package information with tracking information recorded upon delivery of the packages to the transfer location. Correlation of the information allows the first carrier computer system to generate a manifest that can be audited by the second carrier, allowing the second carrier to efficiently and confidently bill the first carrier for delivery of the packages to the selected destinations. As another advantage, the second carrier may be bound to delivery rules of the first carrier so delivery performance is transparent to the package recipient.

Broadly stated, a combined carrier shipping system for shipping a plurality of packages of one embodiment of the present invention includes a first and second carrier physical delivery systems and a shipment ordering system. Each of the first and second carrier physical delivery systems is configured to deliver one of the packages to a consignee location. The shipment ordering system is connected in communication with the first carrier physical delivery system. The shipment ordering system is configured to record a request to ship the package and package information associated with the package. Included in the package information is a consignee location to which the package is to be delivered. Also, the shipment ordering system is configured to determine whether the consignee location meets a stored condition for single carrier delivery by the first carrier physical delivery system. In response to the single carrier condition being met, the shipment ordering system is configured to initiate delivery by the first carrier delivery system from a starting location to the consignee location. Alternatively, in response to the single carrier condition not being met, the shipment ordering system is configured to initiate delivery of the package by the first carrier delivery system from the starting location to an intermediate location for further delivery by the second carrier physical delivery system to the consignee location.

A combined carrier shipping information system of another embodiment of the present invention includes a shipper computer system. The shipper computer system includes program logic configured to record package information entered by a shipper, including a delivery address, and additional logic configured to determine whether the delivery address is an efficient location for delivery by the first carrier. For instance, a postal code of the delivery address can be compared to a database of rural and urban postal codes, wherein the second carrier has infrastructure in the rural area for efficient delivery. Additional logic of the shipper computer is configured to instruct the first carrier to route packages destined for less efficient delivery addresses, such as the rural address, to a transfer point at which the second carrier is willing to take over shipping. Advantageously from the point of view of the first carrier, the shipper computer system avoids situations in which the first carrier will incur non-recoupable costs for delivery, while at the same time ensures that profitable deliveries are completed by the first carrier.

The shipper computer system may also be configured to correlate the less efficient address with the transfer location from which the second carrier is willing to deliver the package to the less efficient address. The transfer location could be, for instance, the rural post office or destination delivery unit of the USPS that delivers to the rural zip code of the destination address.

In another aspect, the shipper computer system may be configured to generate a label for delivery to the less efficient delivery address. Indicia on the label preferably include the transfer location address, tracking numbers for both the first and second carriers, and the destination address. The indicia preferably are machine readable encoded information in the form of bar codes, dense or two dimensional codes, RFID tags or labels, or any other addressable tag, label, or indicia. Such a label facilitates delivery of the package by the first carrier to the transfer location and transfer of the package to the second carrier for final delivery to the destination address as also marked on the label for use by the second carrier. The label may also include symbolic codes representing the package information, tracking numbers, etc. to promote easy electronic recording of the information. Notably, the label itself may also be an embodiment of the present invention separate from the information system.

A combined shipping information system of another embodiment of the present invention comprises a first carrier computer system. The first carrier computer system includes a package information system, a tracking system and a verification system. The package information system is connected in communication with the above-described shipper information system and is configured to receive package information, including the recipient address, transfer location address, and both carrier tracking numbers, from the shipper information system. Package information may include, for instance, shipper number, weight, consignee address (e.g., location), direct delivery unit address, date, and tracking numbers.

In communication with the tracking system by any suitable method is a tracking input device (e.g., a barcode scanning device) positioned at the transfer location, wherein the tracking system is configured to receive scanned package tracking numbers from the scanning device indicating that packages have reached the transfer location. The verification system is in communication with the package information and tracking systems and is configured to obtain the package information and tracking information therefrom. Further, the verification system is configured to construct a manifest by correlating the package information with the packages received at the transfer location using one of the tracking numbers. Advantageously, the manifest is deliverable to the second carrier for audit and billing of the first carrier, allowing the first carrier to obtain discounted shipping to the recipient address by the second carrier.

The first carrier computer system may also be further connected in communication with a second carrier tracking system configured to confirm delivery of the package by the second carrier. In such a case, the verification system is configured to add the delivery confirmation to the manifest by correlating the second carrier tracking number of the package information and the tracking number recorded at confirmation. Advantageously, the verification system unites the disparate information from the package information and tracking systems thereby facilitating future business decisions as well as immediate billing concerns.

A system according to the invention may provide tracking information access to the shipper, the recipient, the two carriers, and other authorized entities. For example, a shipping label as prepared by the shipper may contain scannable tracking numbers for both carriers. Both such tracking numbers can be associated with the package in a tracking database. The first carrier operates a known tracking information system which uploads tracking information to the database upon each scan of the package label as the package travels through the first carrier's delivery network, as well as upon delivery of the package to the second carrier. The second carrier scans the package at least upon delivery to the recipient, and uploads the information to its computer system, from which the information can be transferred to the first carrier's tracking database. The shipper, the recipient, the two carriers, and other authorized entities thus may access the first carrier's tracking database to obtain consolidated tracking information about the package originating from both carriers who handle the package. The tracking database can be maintained by either carrier, or even by a third party. Consolidated tracking information from the consolidated system may also be sent without request ("pushed") to any of these parties.

In another aspect, the package information system may be configured to sort package information of packages based on the transfer location to construct a preliminary manifest for submission to the transfer location. At the transfer location, the second carrier personnel can advantageously use the manifest to confirm receipt of all of the packages destined for the transfer location prior to final delivery by the second carrier. Preferably, the preliminary manifest is an electronic manifest corresponding to standards set by the second carrier and is electronically delivered to a unique electronic mail address of the transfer location. As another option, a second carrier computer system may request electronic delivery of the manifest from the personnel at the transfer location for further auditing before billing of the first carrier.

As another alternative, the first and second carrier computer systems may be electronically accessible to the shipper computer system, or a recipient computer system, to allow access to tracking, billing and other information.

In still another aspect, the scanning device may be used to provide information directly to a computer at the destination delivery unit for audit by the second carrier. For instance, wireless communication is established between a personal data assistant and the scanning device. The connection allows the personal data assistant to upload information on packages delivered to, and scanned by the scanning device at, the destination delivery unit. The personal data assistant is further connected in communication with a portion of the second carrier computer system and a printer. Thus, the personal data assistant can relay the scanned information to the printer for printing out a list of the delivered packages, or to the second carrier computer system for audit procedures.

In one embodiment, the combined carrier shipping system of the present invention may also include a billing system. A first carrier portion of the billing system is configured to calculate the shipping charges of various carriers participating in the system. The first carrier billing system is connected in communication with the package information system allowing it to obtain such information as the shipper and recipient location, as well as the type of shipping service provided (e.g., conventional or combined). The package information is used to calculate a sum total of all charges from each carrier for payment by the shipper. Additional information for the first carrier billing system billing calculations may also be obtained from a connection to the tracking system. Information from the system can then be used to control the amount of billing based on the path of a package. The first carrier billing system can also include a single bill generator that is configured to compile the billing charges, adding other surcharges and generating an invoice for submission to the shipper.

A second carrier portion of the billing system is connected in communication with the verification system and receives a shipping manifest of the deliveries received during a day from the first carrier. Also connected in communication with the second carrier billing system is an escrow account from which the second carrier can draw funds for the shipments recorded on the manifest. The first carrier billing system is also connected in communication with the escrow account and is configured to deposit funds received from the shipper in payment for the invoices in the escrow account. Preferably, all of the communications of the invoices, tracking information and transfers of funds occur electronically to improve the efficiency of the shipping system.

In one embodiment, a quality control system may cooperate with the billing system to ensure accurate billing. A first quality control process is implemented by confirming receipt of all package information from the customer computer. Each day, a list of the shipments reported by the shipper computer system is compiled and sent to the shipper for comparison to the shipper's records of package information sent to the package information repository system. Missing package information can then be resent by the shipper.

Another quality control process includes comparing invoices calculated by the first carrier billing statements with delivery confirmations of the same packages. Delivery confirmations are obtained from the tracking system of the first carrier, in the case of conventional delivery entirely by the first carrier, or from the second carrier system in the case of combined carrier delivery. Discrepancies are communicated to the first carrier billing system for adjustment of the invoice.

A further quality control process includes periodic weight and size checks conducted at an operating center of the first carrier. Such weight and size checks may be conducted automatically on a daily basis and compared to the measurements on the same packages recorded from the shipper by the package information system. Discrepancies are reported to the first carrier billing system for adjustment of the invoice. Preferably, comparisons in each of the quality control processes are done electronically.

In one embodiment, the shipping system may also include aspects for facilitating return of packages to the shipper when delivery does not occur. Preferably, the carriers operate under a set of rules for attempted delivery to the recipient. For instance, only a single attempt to deliver a particular package will be allowed. If the recipient is not present to sign for the package, then the first or second carrier will return the package to a holding location, such as an operating center. The package will be held for pickup at the operating center by the recipient for a predetermined time, such as five days. Once the predetermined time has elapsed, the package is returned to the shipper.

At the shipper location, return of the package to the shipper is recorded using a scanning device. The information from the scanning device is recorded by the tracking system of the first carrier computer system and is accessible by the verification system for matching with the package information from the package information system using the tracking number. The return information is accessed by the billing system and a billing adjustment is made for the undelivered package described with the package information. In one aspect, the adjustment is an additional charge (typically equal to the outbound delivery charge) for the return of the package.

One of the advantages of the present system includes the use of electronic transmission of the tracking, billing and other information on delivery of the packages to facilitate combined delivery by multiple shipping services. As a result, the combined shipping system can automatically coordinate information flow, package delivery flow and funds flow amongst multiple carriers in a way that is efficient and reliable. Another advantage is the cost-savings realized by the shipper computer system, which identifies the most efficient packages for delivery by the shipping services with differing capabilities.

Compilation of manifests by the first carrier computer system instills sufficient confidence in accurate billing in the second carrier that it allows participation in reduced rate delivery services. Auditing by the second carrier is further facilitated by coordinating package information with tracking information of both carriers. Quality control checks further confirm that the shipper is correctly entering package information, and when coordinated with audits by the second carrier, results in multiple, closed-loop confirmations of the accuracy of billing. In addition, the return system tracks returns and supplies information on returns to the billing system for refunding of billing charges paid on returned packages. As a result, each of the parties has sufficient confidence in the accuracy of billing and delivery tasks to be willing to share resources and lower the overall cost of shipping. In various embodiments, other advantages are realized, not all of which are explicitly listed hereinabove, will be apparent from the detailed description and the appendices.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout. The term "exemplary" is used to be an example with no indication of quality level.

Figure 1:
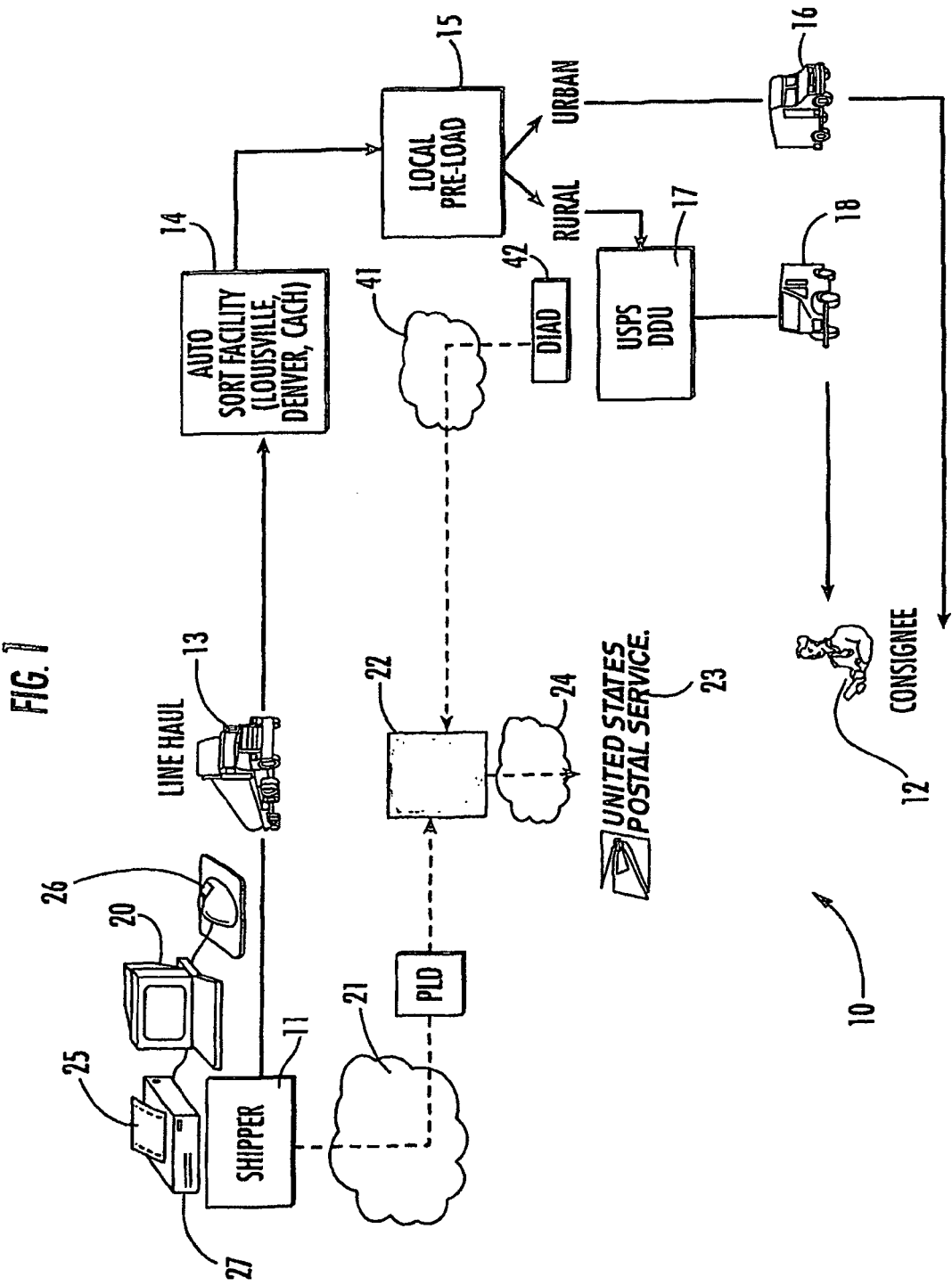
FIG. 1 is a schematic of one embodiment of a combined carrier shipping system of the present invention.
Figure 2:
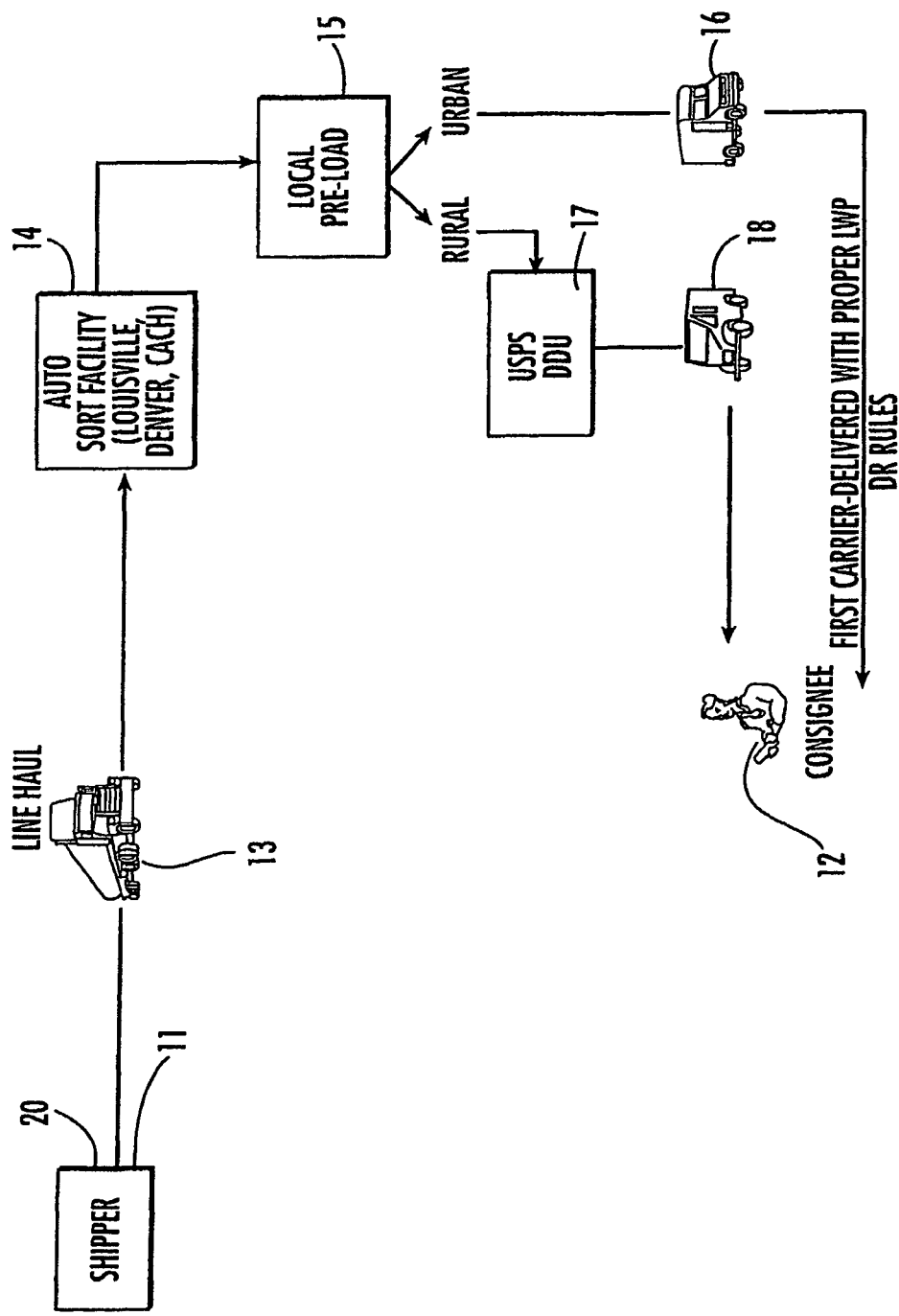
FIG. 2 is a schematic of the physical delivery facilities of the combined shipping system shown in FIG. 1 according to one embodiment of the present invention.

A system 10 for combining the shipping services of multiple carriers ("the shipping system") of one embodiment of the present invention is shown in FIG. 1. The shipping system ships packages (used herein to refer to any item being delivered, for example, parcels or mail), from a shipper 11 to a consignee or recipient 12. The shipping system 10 has a variety of physical facilities for facilitating delivery of packages (movement of which is indicated by the solid lines), including line haulers 13, a sorting hub 14, a preload facility 15 and carrier delivery facilities (vehicles, personnel, etc.) 16, each of which are preferably operated by a first carrier, as shown in FIG. 2. A second carrier (e.g., the USPS), operates its own destination delivery unit 17 and carrier delivery facilities 18, which in the case of the USPS are local post offices and mail delivery personnel, vehicles, etc. The conventional operation of such USPS systems is well known.

Referring again to FIG. 1, the shipping system 10 also includes a variety of communications systems that are preferably electronic in nature. The communication systems include a shipper computer system 20 connected electronically via a network 21 to a first carrier computer system 22 and a second carrier computer system 23. The first and second carrier computer systems 22, 23 are also connected via a network 24. Generally, the communication systems allow the efforts of the physical facilities of the two carriers and the shipper 11 to be coordinated for efficient delivery of (and billing for delivery of) the packages.

Information (movement of which is indicated by the dashed lines) conveyed through the communication systems includes package information, e.g., package level details (PLD) such as an origin, destination and weight of each of the packages, which facilitates sorting and delivery of the packages and billing for the delivery services. In addition, the communication systems collect, record, and report tracking information to the carriers, the shipper 11, the recipient 12 and any other interested parties.

The shipper 11 can be a retail shipping outlet, a business shipping a high volume of packages, or any other person or entity wishing to ship packages using the present system 10. In one aspect, the shipper 11 may agree to perform limited pre-processing activities in the present system 10, such as those described below which are facilitated by use of the computer system 20, in communication with the first carrier computer system 22.

The shipper's computer system 20 has software distributed by the first carrier making it configured to record the PLD information necessary to sort, meter and ship each of the packages. In one example, the computer system 20 of the shipper 11 is connectable over the network 21 to a web server (not shown) of the first carrier computer system 22. The web server of the first carrier computer system is configured to send data across the network to display web pages on the shipper computer system 20. Alternatively, the shipper 11 could be directly equipped with software downloaded from the first carrier computer system 22, or sent on media by the first carrier for installation on the shipper computer system 20.

Regardless of the source of the software, the computer system 20 preferably includes software logic for processing all types of parcels according to zip code, weight and tracking number. In addition, the shipper computer system may also include rate information that can be updated periodically by the carrier computer systems 22, 23 via the networks 21, 24, or by other data input or transfer. Further, the shipper computer system 20 may include a database of zip codes separated into groups or indexed by population density, which preferably distinguishes urban and rural destinations. Other software logic may be configured to obtain, or generate, tracking numbers for the packages for both carriers.

Using the software logic, the shipper computer system 20 is configured to prompt and record entry of the PLD shipping information by the shipper 11, such as through the presentation of a graphical-user interface with fields for entry of the PLD information. To facilitate accurate recording of package weights, the computer system 20 may include a scale 26. In addition to the scale 26, the shipper's computer system 20 may also include a label printing device 27 or other type of printer. Once the PLD information has been entered or recorded, the logic of the computer system 20 is configured to use the database of zip codes to match the package zip code with a classification of the package's destination address, which in the illustrated embodiment of FIG. 1 includes the rural or urban classification. In addition to classifying the destination address, the shipper computer system 20 may also have logic and data for determining the destination delivery unit 17 of the second carrier, which corresponds to the recipient's address, if necessary.

Figure 3:
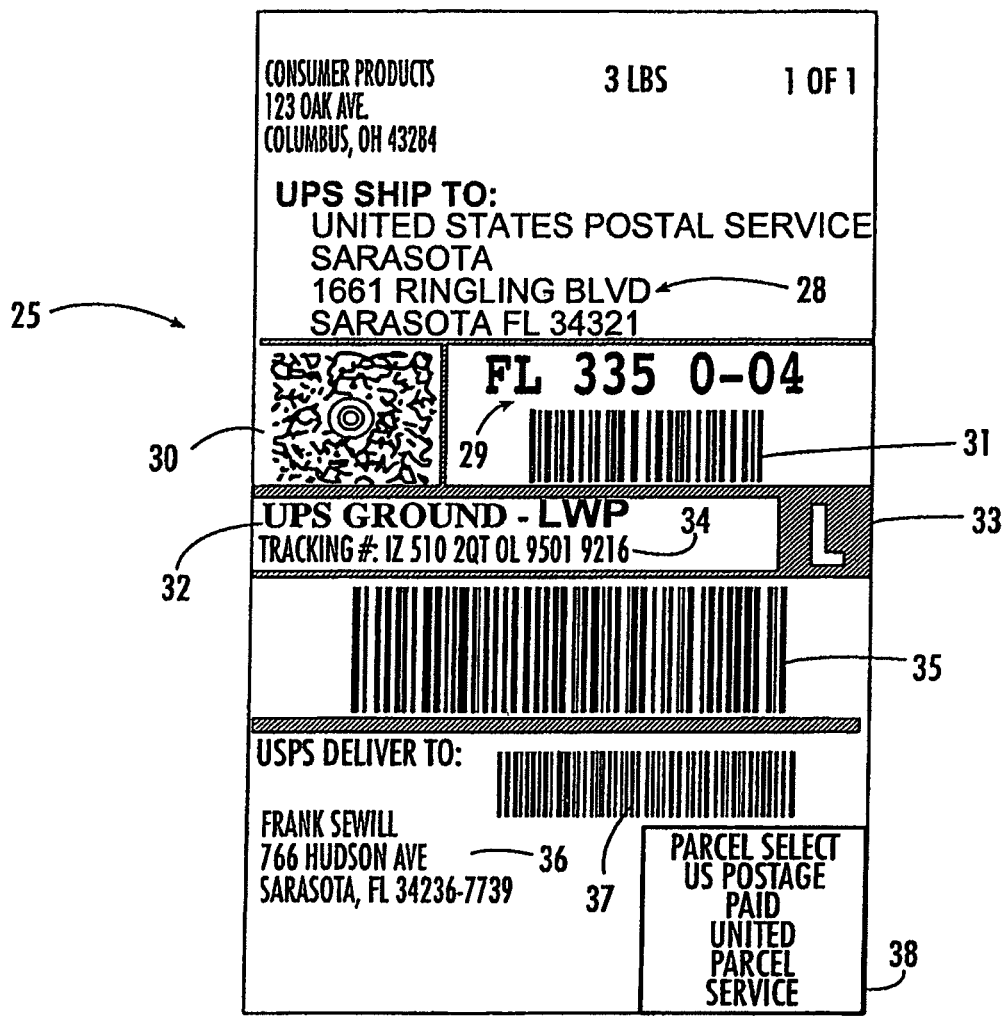
FIG. 3 is a label containing indicia to facilitate transfer of delivery from a first to a second carrier and also from the second carrier to a recipient, said label being another embodiment of the present invention.

The software logic enables the shipper computer system 20 to alert the shipper as to whether the destination address of the recipient 12 is rural or urban and to generate the appropriate label 25 according to the classification. An appropriate label 25 is shown in FIG. 3. Preferably, the urban-bound packages receive a standard first carrier label and are generally handled like a regular package delivered by the first carrier.

Alternatively, for the rural packages (or packages in areas where delivery is not cost-effective for the first carrier due to a lack of facilities, roads, etc.) the shipper may be offered a combined carrier delivery level of service. If the shipper selects this option, the shipper system 20 generates a combination label 25 as shown in FIG. 3. In one embodiment, the combination label 25 includes a second carrier address field 28 that indicates the destination delivery unit 17 to which the first carrier is to deliver the package, as shown in FIG. 3. Above the second carrier address field 28 is a return address field of the shipper 11 and a package weight field, which in the illustrated label 25 is 3 pounds.

Beneath the second carrier delivery address field 28 is a first carrier alphanumeric internal routing code 29 determining the first carrier sorting hub 14 (in FIG. 3 the sorting hub is FL 335 and 0-04 indicates the conveyor belt within the sorting hub) to which the line haulers 13 are to deliver the package. Next to the internal routing code 29 is a Maxicode symbol 30 (a machine readable two-dimensional or dense code) and below the alphanumeric routing code 29 is a barcode symbol 31. The Maxicode symbol 30 contains most or all of the information shown on the label 25 and at least a portion of the PLD information for the package. The bar code 31 duplicates the information contained in the alphanumeric routing code 29, allowing the routing information to be determined using several types of scanning devices.

Beneath the codes 29-31 is a service name field 32 and a service icon 33 indicating the level or type of shipping service, which in the illustrated label is light-weight package (LWP) ground shipping with the icon "L". Beneath the service name field 32 is a first carrier tracking number (in the illustrated label "1Z 510 20T 0L 9501 9216") field 34. Beneath the tracking number field is a tracking number barcode 35 that symbolically represents the tracking number and allows automated scanning of the tracking number.

In a bottom section of the label 25 is a recipient address 36 to which either the first, or second, carrier is to deliver the package, depending upon the aforementioned criteria. Also at the bottom of the label 25 is a second carrier delivery confirmation barcode 37 that will be scanned by at least the second carrier, and preferably both carriers. The bar code 37 contains a second carrier tracking number, and a permit number or sender identification number indicating a source of postage to be paid by the first carrier.

Alternatively, the barcode 37 could also be an alphanumeric code, or other symbol, that is unique to the package. It should be noted that in the illustrated embodiment of the label 25 the first and second carrier tracking numbers are included on the label which allows the two numbers to be associated with each other in a database in at least the first carrier computer system 22. The presence of both tracking numbers on the label and stored in a common system facilitates communication between the two carrier computer systems 22, 23, as well as providing consolidated tracking information to authorized persons. Parcel select indicia 38, which is adjacent to the recipient address 36, indicates that the first carrier will pay the postage for delivery by the second carrier (USPS).

Figure 8:
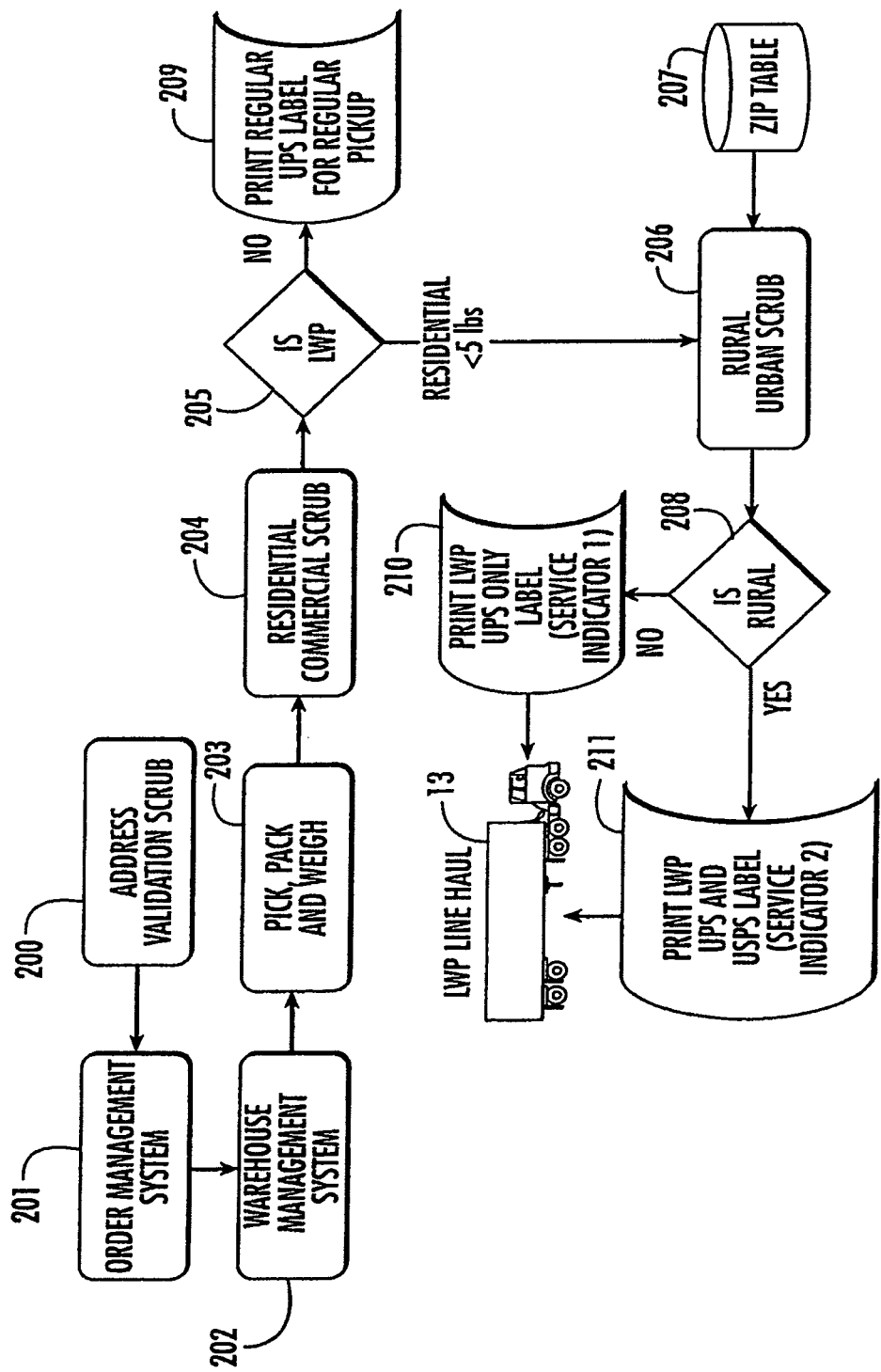
FIG. 8 is a schematic of a flow of preprocessing of a package by a shipper of shipping system illustrated in FIG. 1.

An exemplary flowchart of the duties of the shipper 11 and shipper computer system 20 is illustrated in FIG. 8. PLD information is entered into the shipper computer system 20 and the destination address validated in a step 200, such as by verifying that the zip code is found in the state. The PLD information is coordinated with an order management system in step 201 and a warehouse management step 202 wherein the order is processed and the contents of the package are located. In a "pick, pack and weigh" step 203 the contents are selected, packed (such as in a conventional shipping container) and weighed by the scale 26. In a residential versus commercial classification step 204, the computer system 20 determines whether the delivery is to be to a residential or commercial location, such as by a comparison of the destination address to known commercial or residential addresses, by the amount of packages in the order or by an actual indication of the recipient 12 when placing the order.

If the package is a commercial order, or is above a maximum weight (e.g., 5 pounds) as determined by a step 205, the label printing device 27 prints a conventional delivery label in a step 209. In a step 206, the shipper computer system 20 consults a zip code database or table 207 having postal or zip codes in two groups, rural and urban. One of the rural or urban codes in the table 207 is matched to the postal code of the delivery address contained in the PLD information in a step 208. If the destination is an urban destination, a conventional label indicating lightweight package delivery solely by the first carrier is generated and printed in a step 210 by the computer system 20. Alternatively, if the destination is a rural destination, the combined carrier label 25 illustrated in FIG. 3 is generated and printed in a step 211 by the shipper computer system 20.

Advantageously, by using the delivery system 10 the first carrier avoids delivering packages to rural areas where it is less efficient, justifying shipping at a discounted rate. However, alternative or additional classifications (conditions) may be used that are not limited to population density. For instance, other classifications may describe varying capabilities of the physical delivery facilities of the first carrier, such as the proximity to a sorting hub, an airport or a destination zip code in the middle of a complete road network. In other words, the classifications could distinguish areas to which the first carrier can deliver packages more easily and with lower cost from other areas. In addition, embodiments of the present invention may be extended to three or more carriers, each having their own area of efficiency, either within the delivery process, or geographically. The term "efficiency" as used herein not only indicates the cost of a service, but can also refer to the amount of time required to implement the service. It could also include some other measure of effort required to perform the service or consequences of performing the service.

Figure 4:
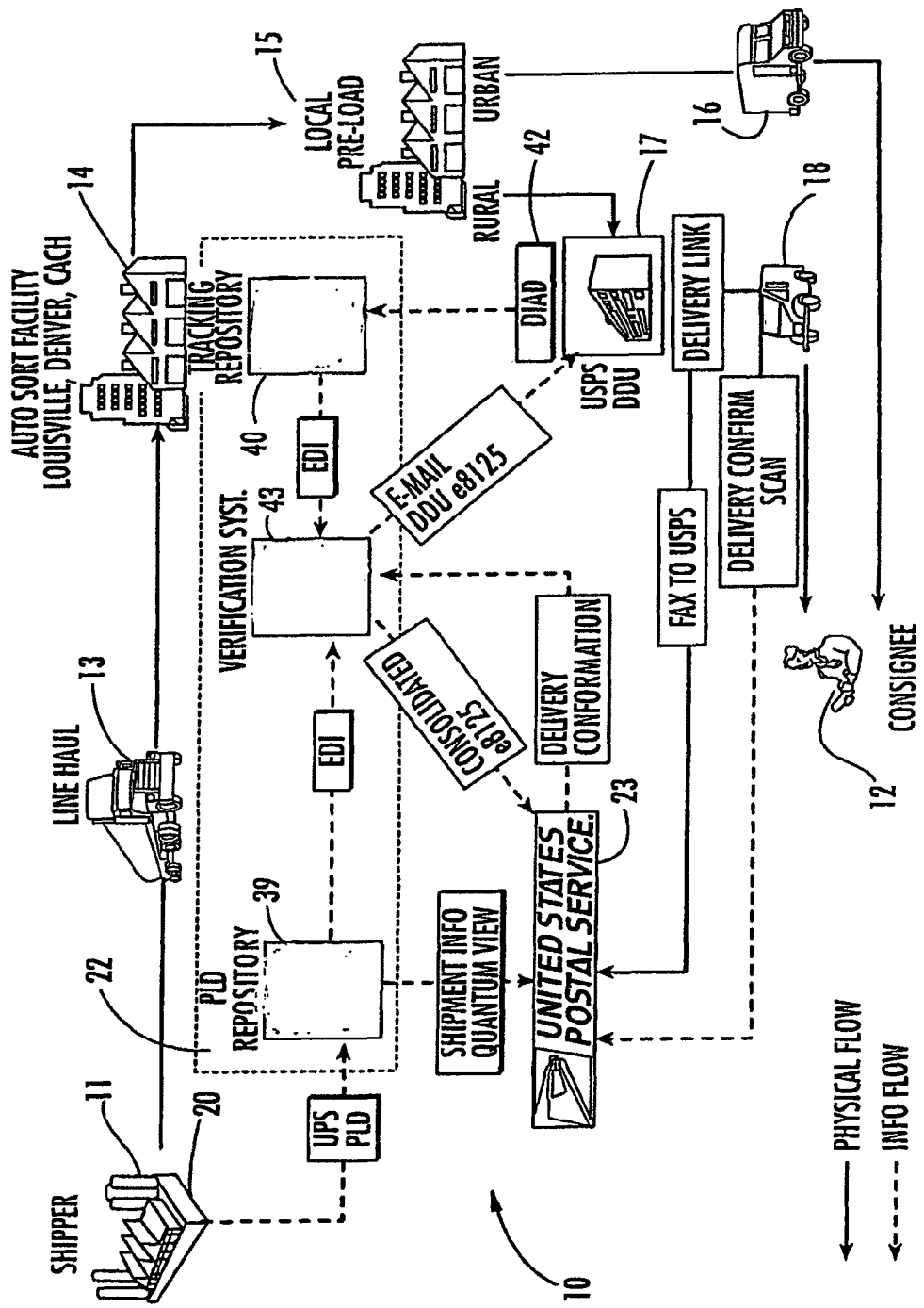
FIG. 4 is a schematic of another embodiment of a combined carrier shipping system of the present invention including the creation of electronic manifests.

Referring to FIG. 4, PLD data, including the data corresponding to that on the label 25, is accessible by the shipper computer system 20 over the network 21. The first carrier computer system 25 includes a PLD repository system 39 and a tracking repository system 40. The systems, 39 and 40, may be integrated with the remainder of the first carrier computer system 22, such as the embodiment illustrated in FIG. 1, or may be distinct systems interconnected via a network, as shown in FIG. 4. The PLD repository system 39 is configured to obtain the PLD information from the first carrier system 22 and storing the PLD information for further use by the shipping system 10. Additional logic may also reside on the PLD system 39 that allows the generation of preliminary reports, or manifests, which are sent to the second carrier to prepare it for incoming packages from the first carrier.

The tracking system 40 has program logic and storage configured to obtain tracking information from the package as it travels through various points along the physical delivery path. For instance, the tracking repository system may be connected in communication over a cellular telephone network 41 to a code scanning unit such as a sorting hub scanner or a delivery information acquisition device (DIAD) 42, as shown in FIG. 1. In particular, the DIAD device is portable and is carried by the delivery driver delivering the package to the destination delivery unit (DDU) 17 of the second carrier which is preferably nearest the to the recipient or consignee 12, or other intermediate physical pickup or delivery location along the path of package travel. The DIAD device includes a bar code scanner for reading the tracking number barcode 35 on the label 25, and a signature capture pad.

Captured symbol and signature information is stored temporarily in the unit, and then transferred via an optical link to a docking station located in the delivery vehicle. From this station, the information is transmitted to the tracking system 40 via the cellular telephone network 41. Other systems use radio frequency (RF) networks to relay tracking information to a central computer directly from the scanning unit. Scanning and barcode reading operations are described in more detail in commonly assigned U.S. Pat. No. 5,770,841 entitled System and Method for Reading Package Information, which is incorporated herein by reference.

The first carrier computer system 22 also includes a verification and manifest generating system 43, as shown in FIG. 4. As will be described in more detail below, a final manifest allows the shipping system 10 to "close the loop," which is advantageous because the second carrier receives the packages at the destination delivery unit 17 and completes delivery of those packages without an up-front collection of the PLD information necessary for billing. Subsequent to delivering the package to the recipient, the second carrier obtains the final manifest from the first carrier (preferably electronically), which allows billing of the first carrier by the second carrier. As described below, the system 43 also can generate a preliminary manifest for submittal to the second carrier's transfer location 17 (such as a DDU) via automatically generated electronic mail.

The verification system 43 is connected in communication with the PLD and tracking systems 39, 40 and is configured to obtain PLD data and tracking data, respectively, from those systems. The verification system includes software logic configured to identify all of the packages inbound to a particular location, such as the sorting hub 14, local pre-load facility 15, the recipient location 12, or the USPS destination delivery unit 17. The verification system is also configured to generate a drop shipment verification and clearance manifest, preferably an e8125 which is an electronic version of the 8125 form required by the USPS for any large-quantity drop shipment delivered to a destination delivery unit 17. In the embodiment of FIG. 4, a portion of the verification system 43 logic resides on the PLD system 39 and allows the second carrier to access a preliminary manifest of packages inbound to a particular location.

Figure 5:
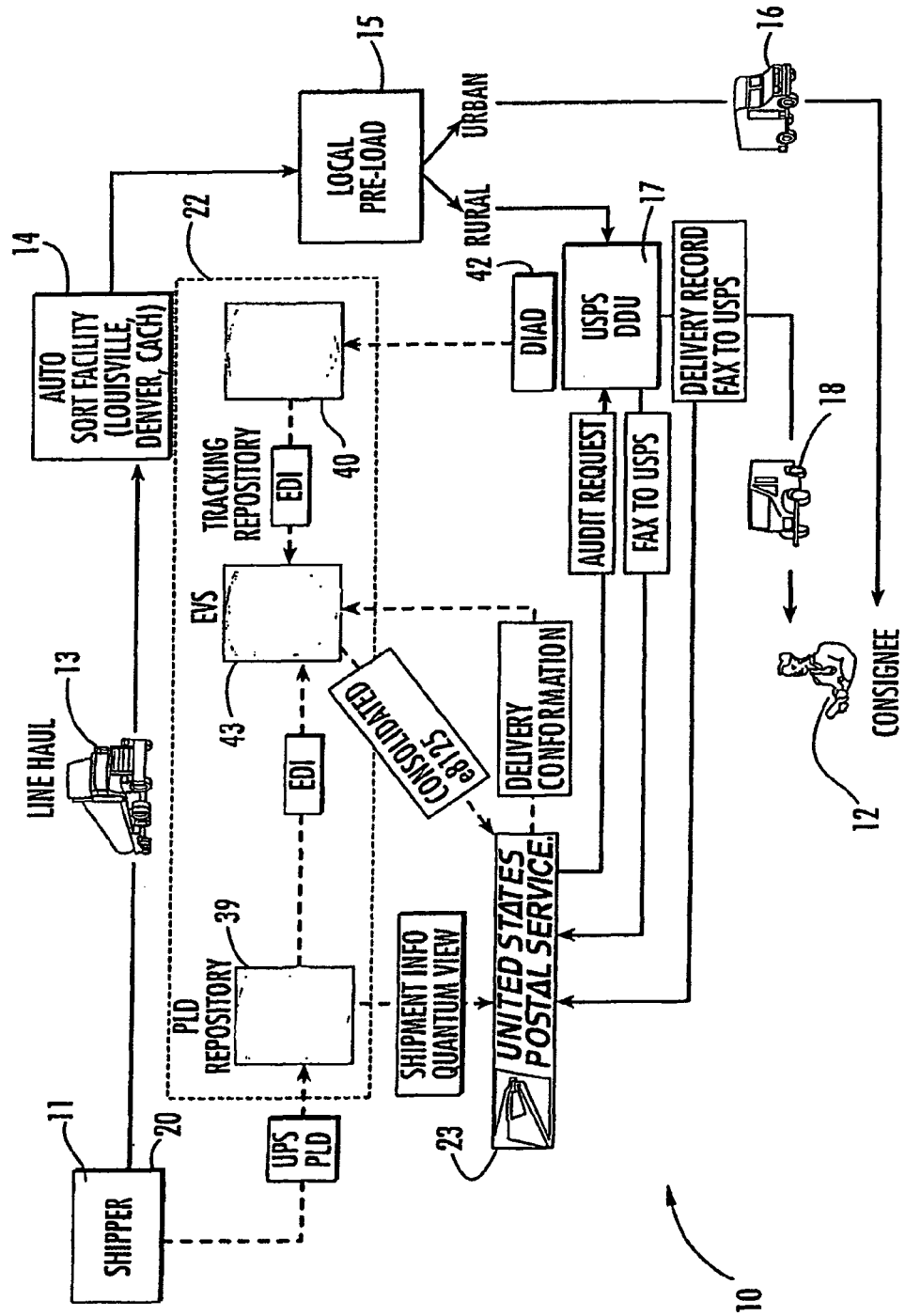
FIG. 5 is a schematic of another embodiment of a combined carrier shipping system of the present invention.

Communication within the first carrier computer system 22, i.e., between the PLD system 39, the tracking repository system 40 and the verification system 43 (and possibly the other systems) preferably occurs by electronic data interchange (EDI) which is a well-known set of standards and technologies designed to automate the sending and receiving of routine business documents. Communication between the second carrier computer system 23 and the first carrier computer system 22 is also preferably electronic. For instance, the second carrier system 23 may include software allowing connection to, and viewing of summary manifests on, the PLD system 39, as shown in FIG. 4. The e8125 manifest can also be sent electronically to the second carrier computer system 23, such as via EDI, and to the destination delivery unit 17 of the second carrier, such as via electronic mail. In yet another alternative, communication with the destination delivery unit 17 may be by facsimile, as shown in FIG. 5.

Additional details on communication and handling between shipping facilities and information systems can be obtained from commonly assigned U.S. Pat. No. 6,539,360 entitled Special Handling Processing in a Package Transportation System which is incorporated herein by reference; and International Patent Publication WO 03019333 A2 (6 Mar. 2003), entitled International Cash-On-Delivery System and Method which is also incorporated herein by reference. Further details about communication between a central server and a tracking and PLD systems are disclosed in commonly-owned U.S. patent application Ser. No. 10/176,467 entitled Systems and Methods for Providing Business Intelligence Based on Shipping Information, filed Jun. 21, 2002 which is also incorporated herein by reference.

It should be noted that electronic communication as described herein may be accomplished over various types of networks and with various amounts of manual and automated efforts. As in the example above of a facsimile transmission, personnel at the delivery unit 17 may comply with an audit request from the second carrier computer system 23 by generating a paper manifest, inserting the manifest into a facsimile machine, dialing a number, etc. It should be also noted that the term "network" as used herein should be construed broadly to include all types of electronically assisted communication such as wireless networks, local area networks, public networks such as the Internet, public telephone networks, or various combinations of different networks.

The second carrier computer system 23 preferably is a pre-existing system configured to receive and process the electronic manifests, and of confirming delivery of the packages under its control. In particular, the second carrier computer system 23 receives tracking information through a scan of the second carrier confirmation barcode 37 on the label 25 at the time of delivery, as illustrated by FIG. 4. In the embodiments illustrated in FIGS. 4 and 5, the second carrier computer system 23 is further configured to electronically communicate the confirmation information directly to the verification system 43 upon receipt.

During operation of the present shipping system 10, the shipper weighs the packages to be shipped and segregates the packages into those for which use of the combined carrier service is desired, and those for which normal first carrier delivery service is desired. The combined carrier service may require, for example, low priority, low weight (e.g., less than five pounds) packages desired to be shipped at a discount. The shipper 11 then enters PLD for all the packages for the various service levels into its computer system 20. The PLD includes the recipient address which includes the zip code the computer system 20 uses to determine whether the delivery is to a zone eligible for combined carrier delivery, such as a rural area For an urban delivery, combined delivery service generally is not offered. A standard shipping label is generated and affixed to the package and the package is entered into the standard delivery process. When combined carrier delivery service is requested and available, the specialized label 25 is generated, including both transfer and recipient delivery addresses, and the first and second carrier tracking numbers. The PLD information is then communicated over the network 21 to the PLD repository system 39 of the first carrier.

Once the packages have been pre-processed by the shipper, the line haulers 13 pick up the packages from the shipper (or other starting location) and deliver them to the sorting hub 14 of the first carrier. All levels of service are commingled for this portion of the delivery path. At pick up from the shipper, the packages may be scanned by a DIAD so that tracking information is transmitted to the tracking system 40, or tracking information for the list of packages may be downloaded into a DIAD from the shipper computer system 20. Notably, tracking information can be reported by DIADs or other scanning units to the tracking system at several points along the physical delivery path by the first carrier, in a known manner not explained in detail here. At the hub 14, the packages are sorted for delivery in a conventional manner, but with a possible delay imposed due to the low priority of the packages. Generally, the sorted loads of combined carrier service packages are processed only when there is available capacity at the hub 14. From the hub 14, the first carrier ships the packages to its preload facilities 15.

Notably, the first carrier does not reweigh the packages weighed by the shipper 11 and the second carrier also agrees to accept the shipper-provided weight. If necessary, periodic audits of the shipper information are conducted to ensure accuracy. As another measure to ensure correct billing, the second carrier computer system 23 (and in particular the PLD repository system 39) will not accept submission of a shipping request without both the PLD and first carrier tracking code to ensure that all shipments are properly manifested and billed.

At the preload facilities 15, further sorting segregates according to zip code those packages to be delivered by standard first carrier service from those packages to be delivered by combined carrier service, typically bound for rural (or super-rural) zip codes. The packages bound for other (typically urban) destinations are delivered by the first carrier in a conventional manner.

The combined carrier delivery packages are delivered directly to the second carrier destination delivery unit 17 by the first carrier. Upon arrival of the packages at the destination delivery unit, the first carrier driver scans each of the packages in accordance with normal bulk stop practice, then has personnel of the second carrier verify the package count and sign the DIAD 42 for the packages. The DIAD transmits the information on the packages delivered to the DDU 17 back to the tracking system 40. The first carrier driver also submits form 8125 data on the packages to the DDU.

As an alternative to the physical 8125 manifest, the DIAD scan may be used to provide package information directly to the DDU 17. Preferably, the DIAD 42 has the capacity to uplink to a personal digital assistant (PDA) which in turn is in communication with a DDU portion of the second carrier computer system 23. Such communications are preferably wireless, such as through the use of radio frequency signals, an optical interface or infrared signals. In another aspect, the PDA may be in direct communication with a printer at the DDU (not shown) allowing printing of the DIAD scan, or the DIAD itself may be able to directly communicate with the computer system 23 or the printer.

A more complete description of the use of an uplink-type DIAD is disclosed in commonly owned U.S. Pat. No. 6,285, 916 which is incorporated herein by reference. For instance, FIG. 1 of U.S. Pat. No. 6,285,916 illustrates such an uplink system including a DIAD (35 of U.S. Pat. No. 6,285,916) connected via an optical interface (37, 38 of U.S. Pat. No. 6,285,916) to a PDA (12 of U.S. Pat. No. 6,285,916). A mail room PC (40 of U.S. Pat. No. 6,285,916) is connected via an infrared port (23, 42 of U.S. Pat. No. 6,285,916) to the PDA. In this manner, the DIAD can communicate its tracking information directly to the PDA and the PDA communicates the information, in turn, to the mail room PC.

Regardless of how the delivery information has passed to the second carrier, the second carrier then delivers the packages received from the first carrier in a normal manner along with other mail or packages. The second carrier driver scans the delivery confirmation bar code 35 upon delivery to the recipient, and this tracking information is loaded into the second carrier computer system 23, typically within a few hours. For the deliveries by the second carrier, all of the rules for package release of the first carrier are applied. For instance, if the first carrier normally makes only a single delivery attempt, then the second carrier does likewise. Undeliverable packages are then preferably returned to the shipper after a predetermined (e.g., five day) waiting period. In this manner, shipment by the first or second carrier is relatively transparent to the recipient 12.

The verification system 43 subsequently obtains the delivery confirmation information from the second carrier computer system 23, the tracking information from the tracking system 40 and the PLD from the repository system 39 and generates a manifest which is sent to the second carrier system 23. By comparing the information received from these sources, the first carrier can provide an auditable manifest of the day's package shipments to the second carrier computer system 23. For U.S. deliveries, preferably the manifest is sent to the second carrier by 10:00 pm Pacific Time. Upon successful auditing, the consolidated manifest is used by the second carrier to create the bill which is sent to the first carrier describing the exact number of parcels delivered by the carrier. Creation of the auditable manifest inspires the confidence needed by the second carrier to receive and ship large volumes of packages of varying weight, dimension, destination, etc. while foregoing prepayment but still being assured of proper compensation.

In the embodiment illustrated in FIG. 4, the shipping system 10 further includes immediately storing the PLD in the PLD repository system 39, allowing the first carrier to provide advanced shipment notification to the second carrier via electronic mail of the preliminary manifest (e8125). The PLD information contains a unique shipper number associated with each transfer location 17, such as each USPS DDU. Advanced shipment notification gives the destination delivery unit 17 advance notice of the number of packages to expect in a few days for delivery. While the packages are being sorted and delivered by the first carrier, the verification system 43 uses the EDI format to pull data from the PLD repository 39 and builds and sends the electronic manifest (e8125) to the destination delivery unit 17.

As noted above, when the combined carrier delivery packages reach the destination delivery unit 17, the second carrier personnel confirm that the shipment matches the preliminary manifest, sign the DIAD 42. The data is sent immediately to the tracking system 40. The verification system 43 obtains the data from the tracking system 40 and compares it to the PLD data already in memory. As shown in FIG. 4, the second carrier delivery confirmation data, which subsequently is obtained from the second carrier delivery driver 18 via the second carrier computer system 23, provides a third source of information for constructing a final electronic manifest.

The PLD information contains both tracking numbers which allows the first carrier tracking number-referenced information from the tracking system 40 to be matched with the second carrier tracking number-referenced information from the second carrier delivery confirmation. Using these three sources of data, the verification system 43 builds a consolidated electronic manifest (e8125) of the day's packages and sends it to the second carrier computer system 23 for auditing. The manifest may be sorted or arranged as specified by the second carrier to facilitate auditing and billing. For instance, the manifest could be sorted by destination delivery unit 17 zip code, allowing the second carrier to view all packages handled at each DDU for the day.

In the embodiment illustrated in FIG. 5, additional steps may be taken by the second carrier (as facilitated by the combined shipping system 10) to ensure accurate auditing and billing. As in the embodiment above, the electronic manifest is built and sent to the destination delivery unit 17 which compares it to the packages received from the first carrier. The confirmed manifest can then be faxed to the managers of the second carrier computer system 23 for entry therein and reconciliation with the tracking and billing information.

Figure 7:
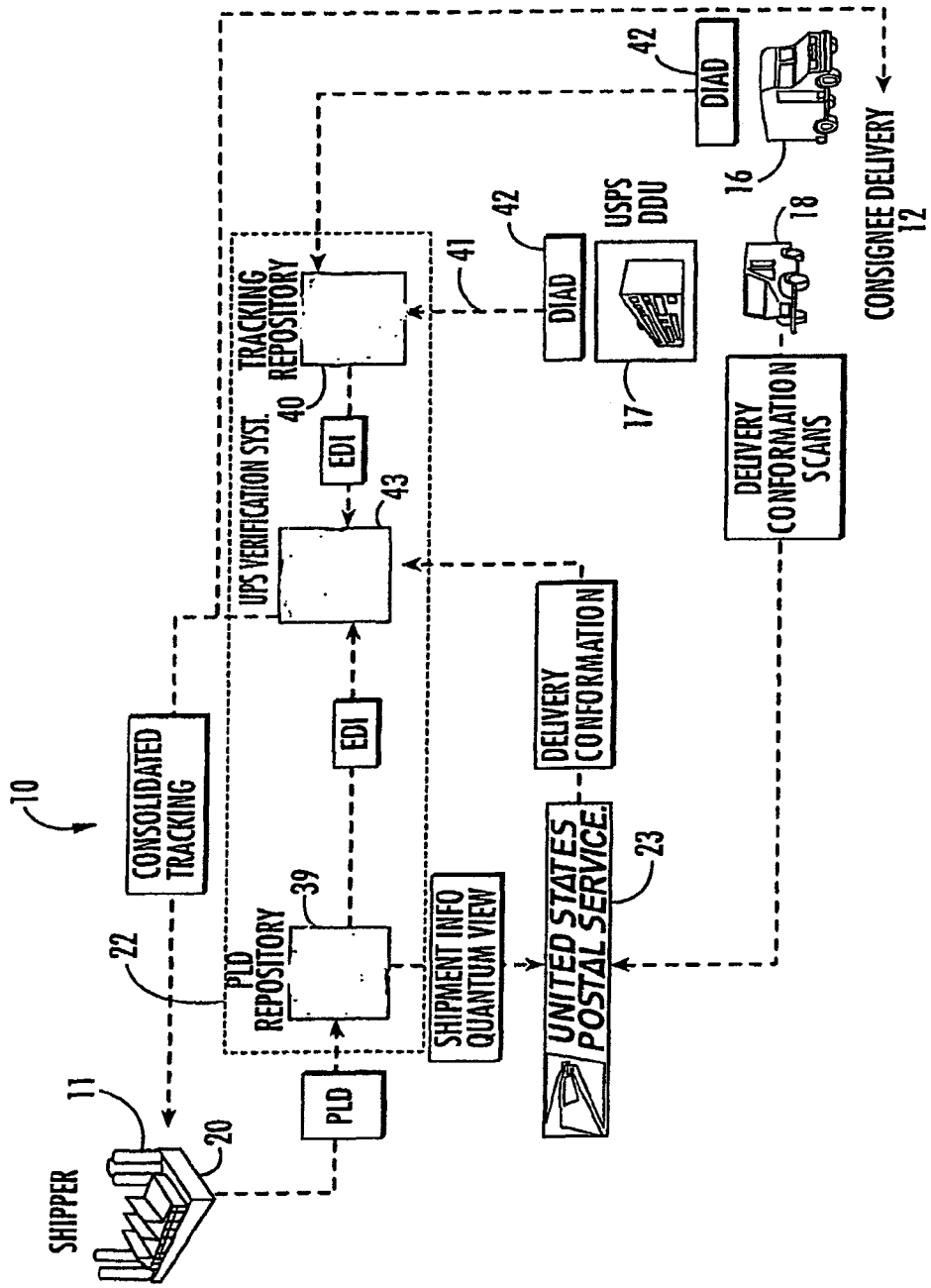
FIG. 7 is a schematic of a flow of tracking information in a shipping system according to one embodiment of the present invention.

FIG. 7 illustrates a flow of tracking information in isolation from the physical flow of the package for additional clarity. The initially submitted PLD information is sent from the shipper computer 20 to the PLD repository system 39. Each of the DIADs 42, in particular one DIAD at the DDU 17 and another at the first carrier delivery facility (truck) 42 communicate first carrier tracking information to the tracking system 40. The delivery confirmation scans of the second carrier are transmitted to the second carrier computer system 23.

Figure 9:
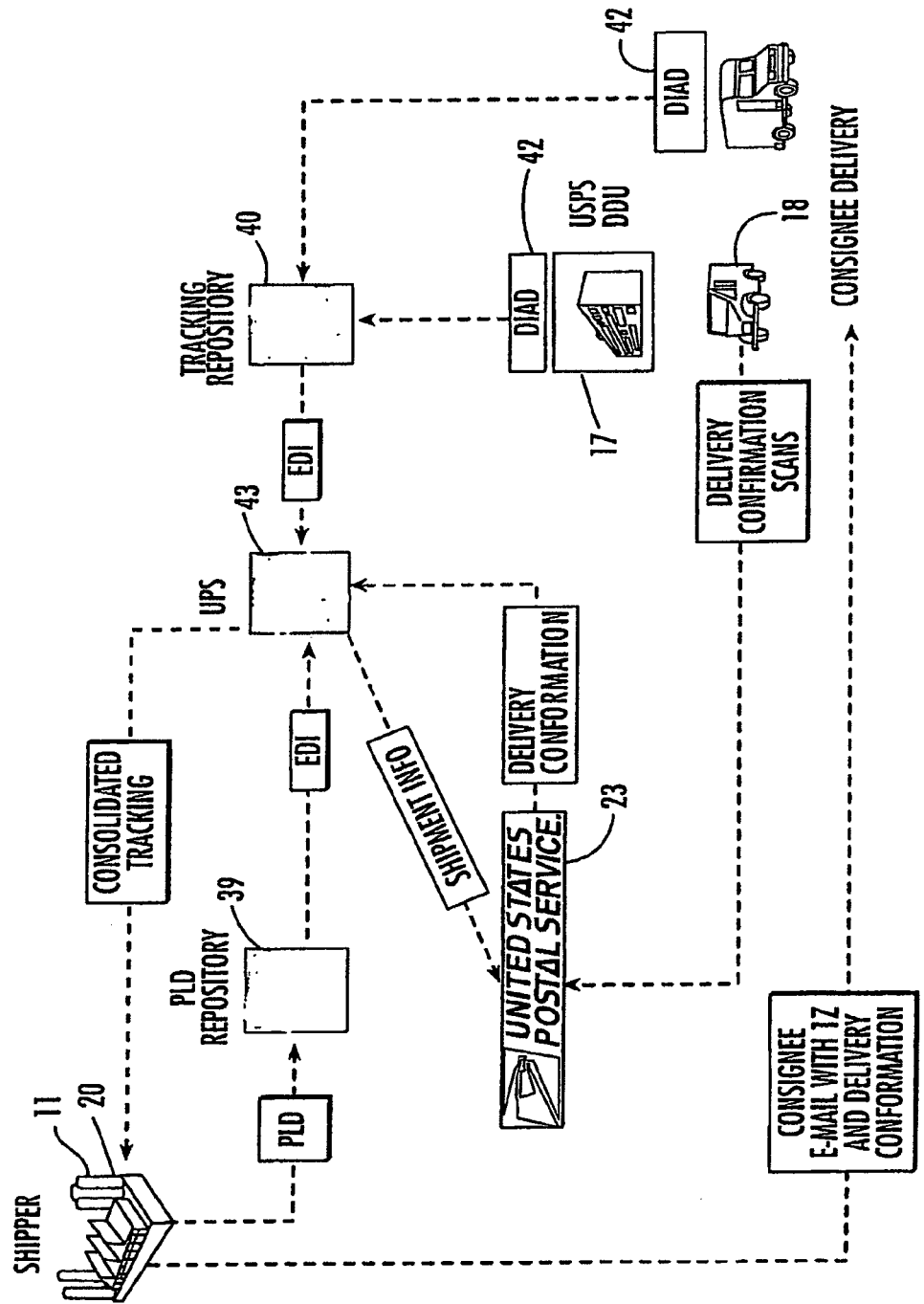
FIG. 9 is a schematic of another embodiment of a combined carrier shipping system of the present invention including an electronic mail confirmation of delivery sent to a recipient.

The verification system 43 periodically pulls the PLD information from the PLD repository system 39 and the tracking information from the tracking repository each preferably using the EDI 213 standard. Delivery confirmation is sent by (or pulled from) the second carrier computer system 23 to the verification system 43. The first carrier tracking number of the original PLD information is matched to the DIAD tracking information and the second carrier delivery confirmation (via the second carrier confirmation tracking number) by the verification system 43. The consolidated tracking information is then uploaded to the shipper computer 20 and may also be made available to the recipient 12. In another alternative shown in FIG. 9, the recipient (i.e., the consignee) is informed of the tracking information, including the tracking number and delivery confirmation, with an electronic mail message.

Figure 10:
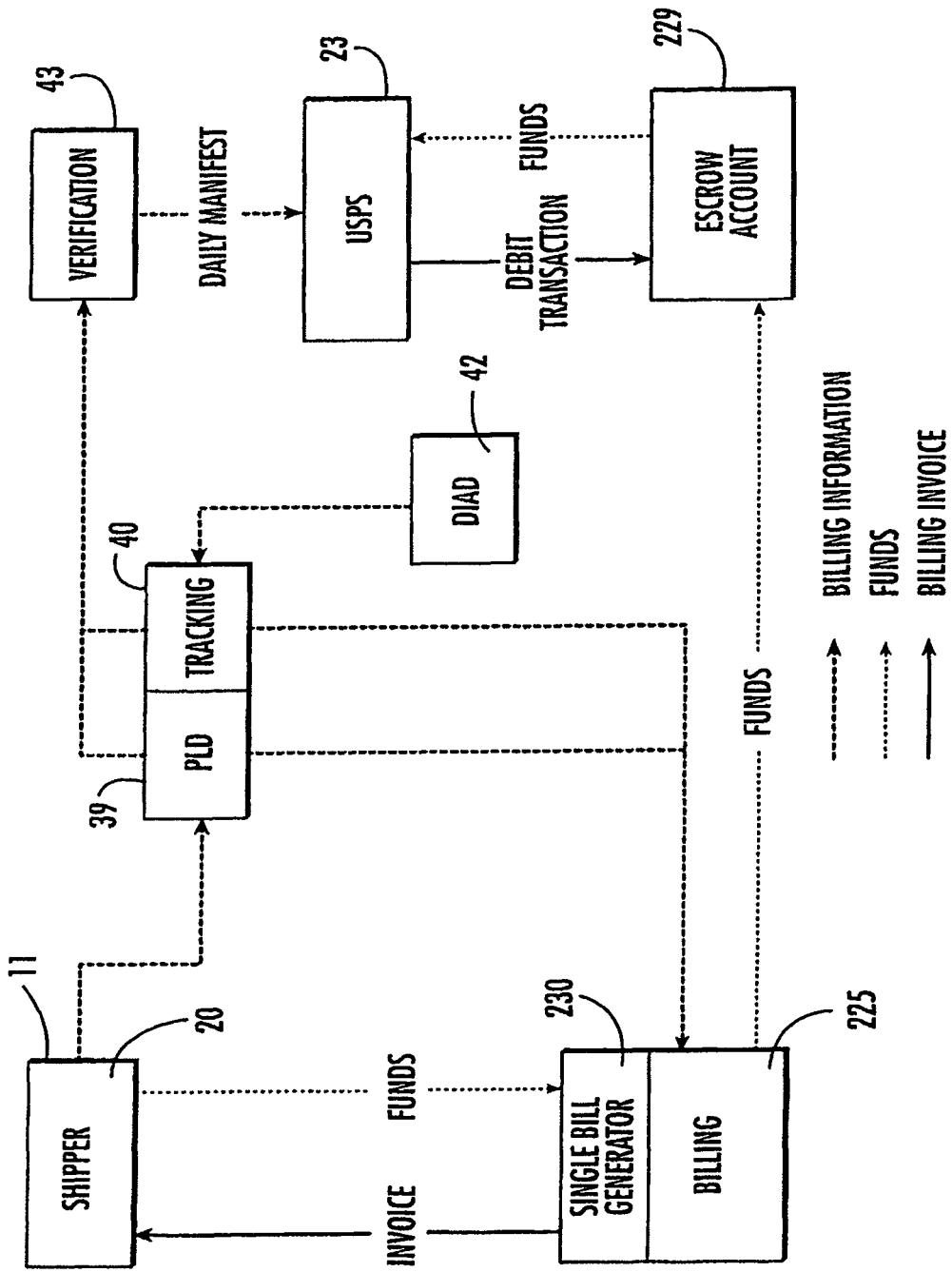
FIG. 10 is a schematic of a billing system of another embodiment of the present invention.

In addition to controlling the flow of tracking information and the physical delivery of packages, the above-described combined carrier shipping system 10 may have additional, or alternative, aspects that allow or facilitate the flow of funds for delivery services. For instance, a billing aspect of another embodiment of the combined carrier shipping system 10 of the present invention is illustrated in FIG. 10. The flow of billing information is indicated in FIG. 10 by a long-dash line, the flow of funds is indicated by a short-dash line and the movement of various invoices is indicated by the heavy black solid line.

A first carrier billing system 225 is preferably a computer system configured to calculate the cost involved with each shipment based on information collected from the other systems. A portion of the cost that includes shipment by the line haul carrier 13 from the shipper 11 to the sort facility 14 is calculated using mileage. Similarly, delivery costs to the DDU 17 of packages determined by the shipper computer 20 to require delivery to rural zip codes (or some other less efficient location) are also calculated. Further, costs are assessed for delivery by the second carrier from the DDU 17 to the recipient 12, when necessary.

The first carrier billing computer system 225 is connected in communication with the PLD repository system 39 from which it obtains billing information, including an indication of whether shipping requires just the first carrier, or a combination of carriers. Preferably, this indication is from use of a specific flag placed by the shipper 11 or the presence of a tracking number for the second carrier in the PLD information. This indication allows a determination by the billing system 225 of whether to include charges from the line haul carrier 13, the second carrier, or both.

The first carrier billing system 225 is also connected to the tracking system 40 from which it obtains tracking information on the progress of physical package delivery. Such information is used to determine the distance, and other indicators of the amount of effort involved in delivery such as the number of stops and sorts, that are factors in calculating the delivery charges. Similar to previously illustrated embodiments, the tracking system 40 is connected in communication with one or more DIADs 42 from which it obtains the information on packages passing through locations along the delivery route.

Billing by the second carrier is implemented by a portion the second carrier computer system 23 which is connected in communication with the verification system 43 and is configured to receive the daily manifest therefrom. Also connected in communication with the second carrier computer system 23 is an escrow account 229 (set up at initiation of the system 10) from which the second carrier can withdraw funds for payment of the fees associated with each daily manifest. In this manner, the second carrier always has immediate access to funds once it has received and completed auditing of the daily manifest.

An integrated, or separate, component of the first carrier billing system 225 may include a single bill generator 230. The single bill generator is configured to compile the charges calculated by the rest of the billing system 225 into individual bills that are easily handled and paid by the shipper 11. The bill generator 230 may also be configured to add additional surcharges to the bill required by the various carriers.

During operation the shipper 11 records shipments on its computer system 20 from which the PLD information is uploaded to the PLD repository system 39. Physical delivery of the packages commences and the tracking system 40 tracks the progress of the packages using the DIADs 42 until either final delivery by the first carrier in the case of conventional packages labeled by the shipper system 20, or delivery to the DDU 17 of the second carrier for transfer.

At the end of each day, the daily manifest is constructed (such as described in detail in the embodiments above) and communicated to the second carrier computer system 23. Upon receiving the manifest, the second carrier conducts the various audit and quality control procedures described above and below and then debits the escrow account 229. Funds are transferred, preferably electronically, from the escrow account to the carrier computer system 23. Alternatively, some or all of the audit and quality control procedures may be conducted after the debit transaction and any necessary corrections refunded or further debited to the escrow account 229.

Either during, or at the end of, the same day, the first carrier billing system 225 obtains PLD information and tracking information from the PLD repository and verification systems 39, 40. The PLD and tracking information determines the individual charges to be levied by the first carrier, second carrier, and line haul carrier, respectively. These charges are packaged in an invoice, along with any other surcharges, by the single bill generator 230 and the invoice is then submitted to the shipper 11.

Payment by the shipper 11, preferably electronically by the shipper computer system 20, is transmitted to the first carrier billing system 225. The first carrier billing system deducts the charges for the first carrier's services (which may also include charges required by the line-haul carrier 13) and forwards the remaining amount, preferably electronically, to the escrow account 229. Advantageously, the escrow account is available for debit by the second carrier at any time, further bolstering the second carrier's confidence that compensation is being received for its delivery services.

Figure 11:
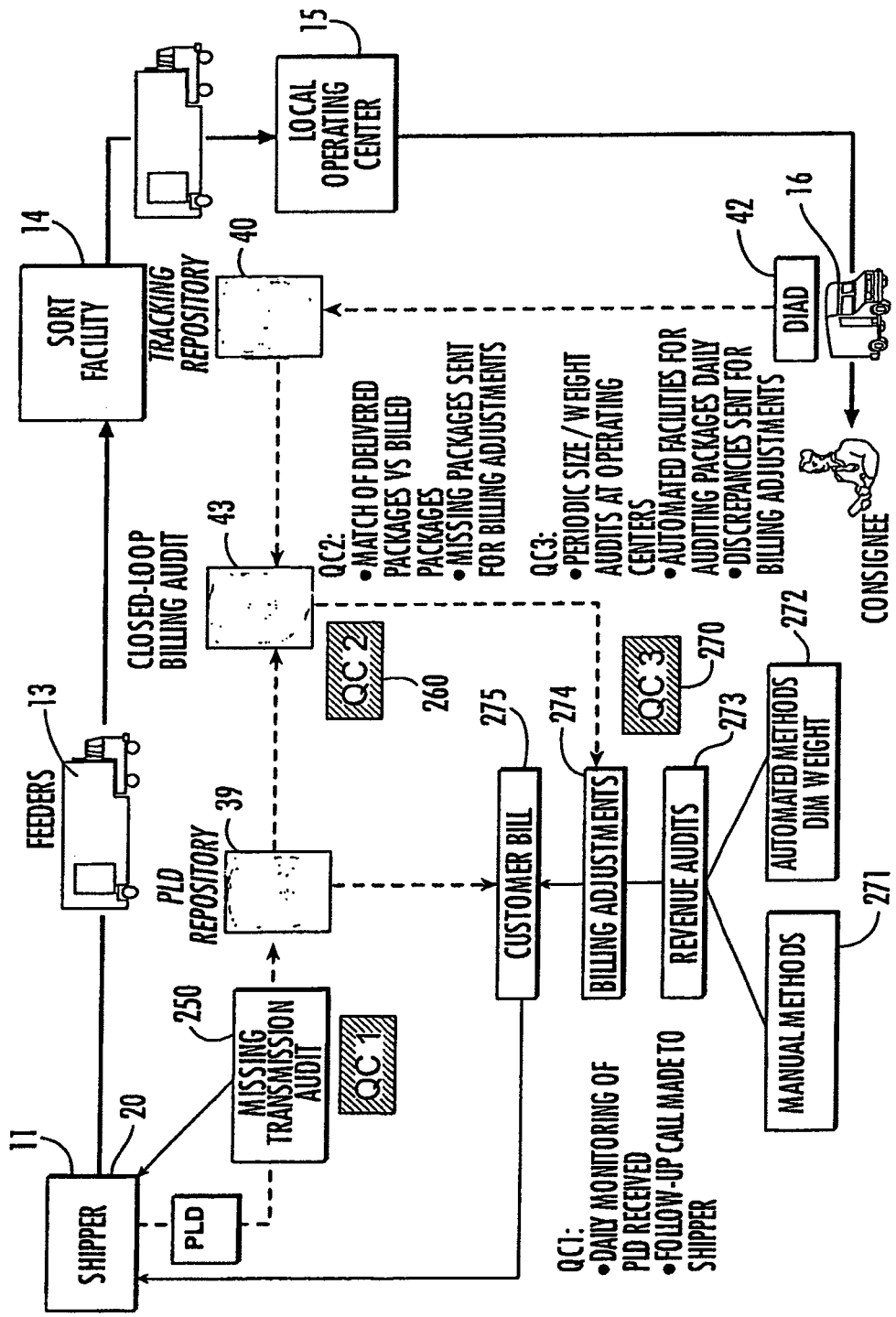
FIG. 11 is a schematic of a quality control system of another embodiment of the present invention.

Billing may be further facilitated by several options for quality control ("QC") wherein the accuracy of the tracking, PLD and other information is confirmed via several audit cycles, as shown in FIG. 11. As shown by a first quality control step 250, the PLD repository system 39 can be monitored for missing transmissions. For instance, follow-up telephone calls or electronic communications (such as an electronic manifest) may be made to the shipper 11 to confirm that all shipments have been received that were sent by the shipper. Such electronic communications would relate the information recorded by the PLD repository system 39 for a day to the shipper 11. The shipper would then compare the records made by the shipper computer 20, or recorded on paper, to those made by the PLD repository system 39. Shipments that failed to be transmitted to the PLD repository system 39 could be retransmitted.

Another quality control step 260 may be implemented using the verification system 43. In step 260 delivery confirmations recorded by the system 43 via communication with the tracking system 40 in the case of conventionally delivered packages entirely via the first carrier, or with the second carrier computer system 23 in the case of combined delivery, are compared with the billing statements sent by the first carrier billing system 225. Discrepancies are communicated to the billing system 225 for adjustment of the bill, e.g., by adding missed packages.

Yet another quality control step 270 is conducted at the operating center 15 by the first carrier. Periodic size and weight checks are conducted at the operating center either manually 271, or automatically 272, or both. The automated facilities are configured to audit packages on a daily basis. An amount of revenue that should be associated with the package size and weight determined by the audit is calculated 273, such as by the first carrier billing system 225. The difference in the initial calculation is compared to the audit calculation and billing adjustments are made 274 and applied to the final invoice or bill 275 before it is communicated to the shipper 11 for remuneration.

In addition to the quality control steps performed by the first carrier, the various audits by the second carrier may also be regarded as additional quality control steps. As described above, the second carrier has an opportunity to compare the packages listed on the electronic manifest (or the capture and printout of the DIAD 42 information) with the packages as they are received at the DDU 17. Discrepancies between the manifest and the actual packages received could be reported to the billing system 225 for adjustment of the bill. Billing could also be adjusted by the second carrier merely adding or subtracting funds from the escrow account 229. A connection between the second carrier system 23 wherein the facsimile of the confirmed manifest shown in FIG. 5 can be used to detect anomalies which are reported to the billing system 225 for adjustment. The net effect of the multiples quality control cycles and audits is that they allow the second carrier to be confident of accurate compensation for its part in the combined package deliveries. In turn, the second carrier can pass on savings from its efficiency in the rural areas to the first carrier.

Figure 12:
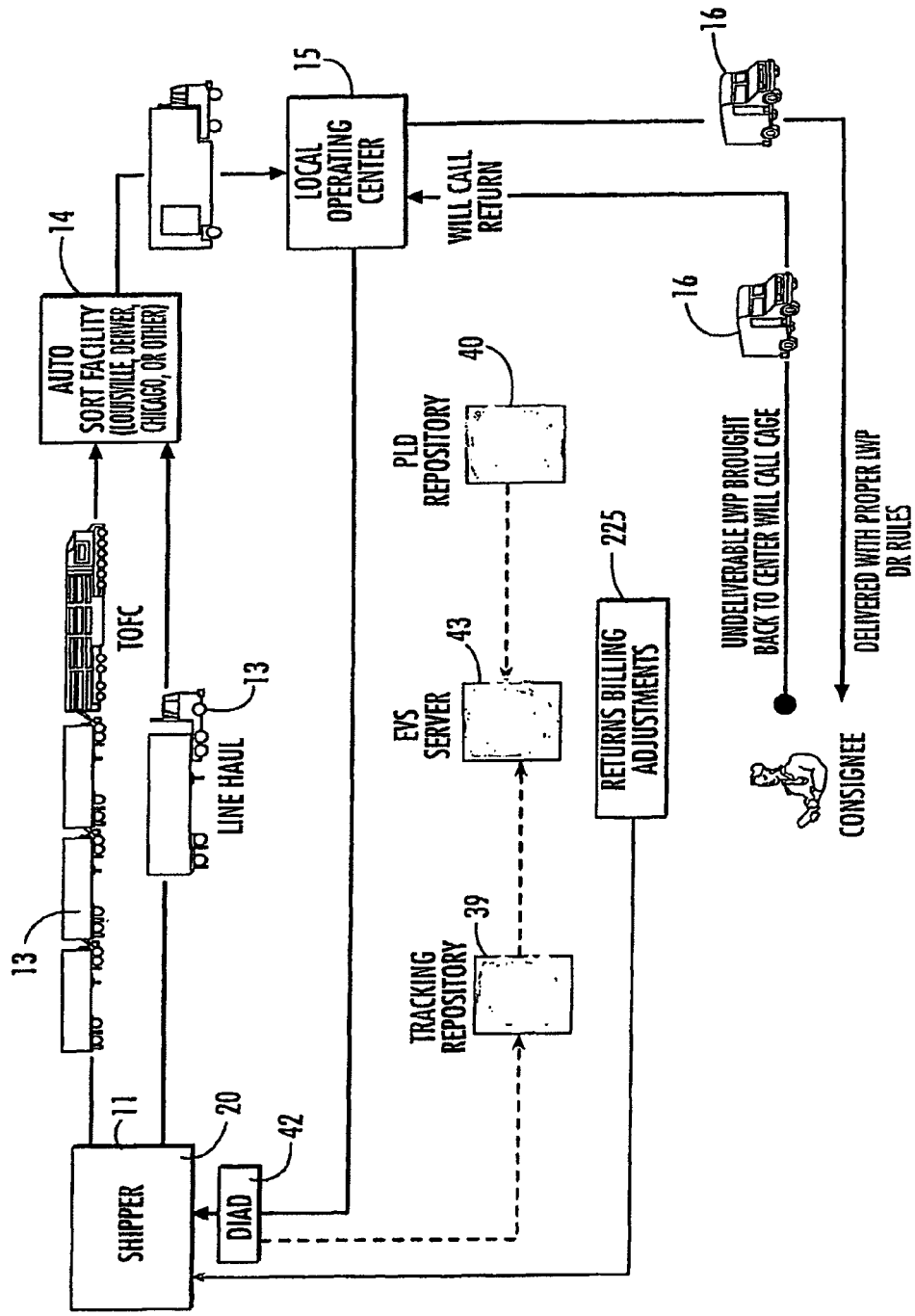
FIG. 12 is a schematic of a returns system of another embodiment of the present invention.
Figure 13:
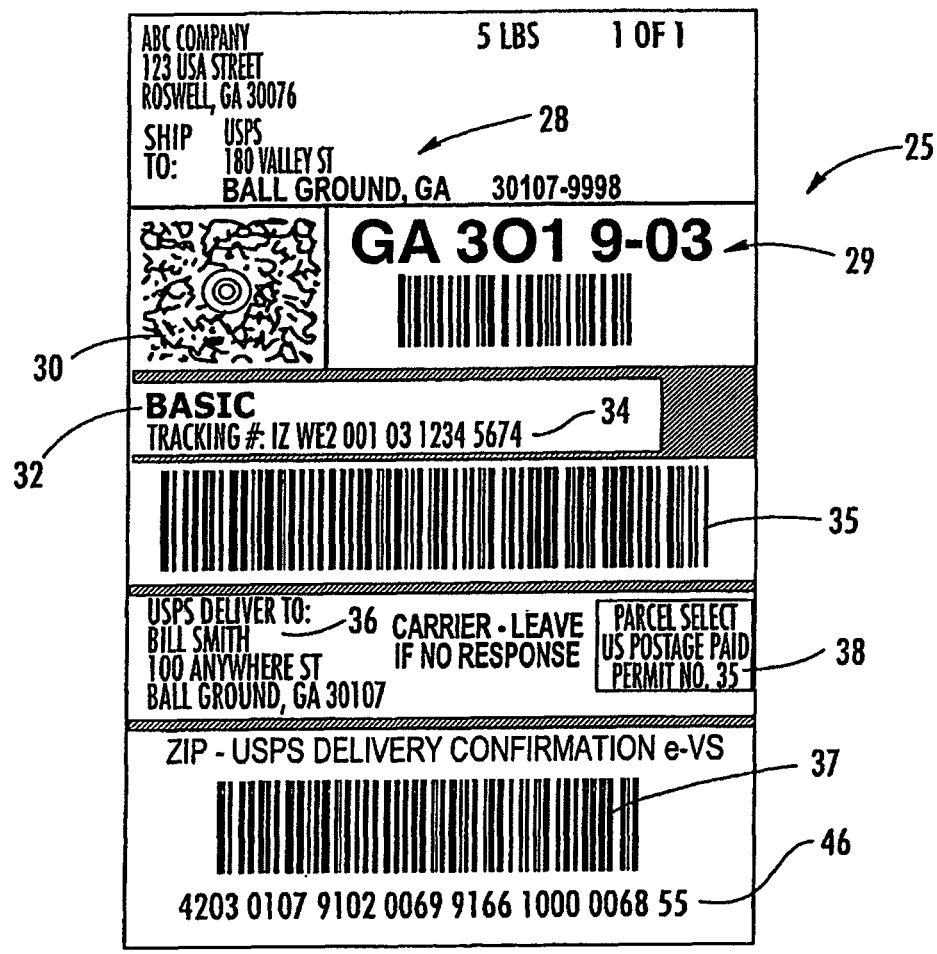
FIG. 13 is an exemplary label containing indicia to facilitate transfer of deliver according to yet another embodiment of the present invention.

In one embodiment, a return aspect of the shipping system 10 of the present invention is illustrated schematically by FIG. 12. Packages delivered under the shipping system 10 are delivered using predetermined customer relationship rules. These rules include rules about delivery times, number of attempts at delivery, duration before return, etc., that govern how returns are handled. For example, the rules may require delivery within 24 hours after the DIAD scan at the DDU, only a single attempt at delivery and if no recipient 12 is present for delivery, a return to the shipper 11 of the package after a 5 day period.

Referring again to FIG. 12, packages are delivered using the aforementioned exemplary customer relationship rules. If the recipient 12 is not present, the package is returned to the local first carrier operating center 15 by the first carrier delivery truck 16. The returned package is held for five days in a "will call" cage at the local operating center, making the package available for call and pickup by the recipient 12.

If the package is not picked up after five days, a return to sender process is commenced wherein the package is returned to the shipper 11. At the shipper's location, a DIAD 42 is used to record the shipper's acknowledgement of receipt of the returned package. The information from the DIAD is recorded by the tracking system 40 and is accessed by the verification system 43 for matching with the PLD information from the PLD repository system 39. The first carrier billing system 225 then calculates the original cost of shipping and adds an additional cost for the return services based on the PLD information obtained from the verification system 43. Typically, return services will have a cost that is about the same as the outbound shipment.

Figure 6:
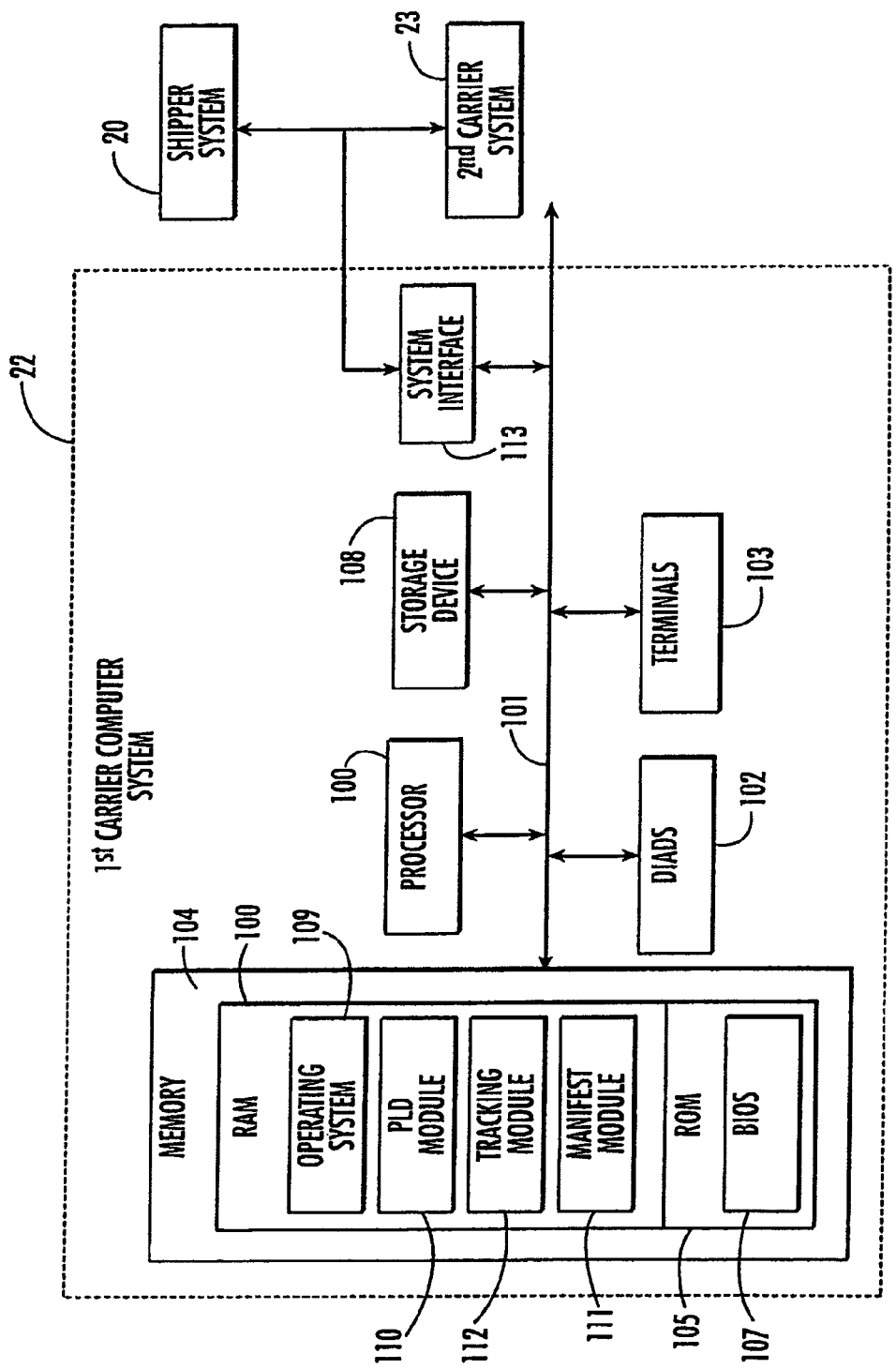
FIG. 6 is a block diagram of a first carrier computer system of yet another embodiment of the present invention.

An embodiment of the first carrier computer system 22 of the present invention is shown schematically in FIG. 6. The first carrier computer system includes a processor 100 that communicates with other elements within the computer system 22 via a system interface or bus 101. Also included in the first carrier computer system 22 are display and input devices, including the DIADs 102 used for tracking and various terminals 103 for receiving and displaying data within the system. The first carrier computer system 22 further includes memory 104, which preferably includes both read only memory (ROM) 105 and random access memory (RAM) 106. The ROM 105 is used to store a basic input/output system (BIOS) 107 containing the basic routines that help to transfer information between elements within the first carrier computer system 22.

In addition, the first carrier computer system 22 includes at least one storage device 108, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 108 is connected to the system bus by an appropriate interface. The storage devices 108 and their associated computer-readable media provide non-volatile storage for the first carrier computer system 22. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices, such as within RAM 106 (as shown in FIG. 6) or within the storage device 108 (as not shown for clarity). Such program modules include an operating system 109, a PLD module 110, a verification module 111 and a tracking module 112. As described both above and below, the PLD module is configured to record and store PLD information from the shipper computer system 20 and may also be configured to generate reports of the packages, along with their PLD information, en route to the destination delivery unit 17. The verification module 111 is configured to generate the billing manifests using the PLD information, tracking information and the confirmation information received from the second carrier. Also located within the first carrier computer system 22, is a system interface 113 for interfacing and communicating with other elements of the overall shipping system 10, such as the shipper computer system 20 and the second carrier computer system 23.

It will be appreciated by one of ordinary skill in the art that one or more of the components of the computer systems described herein may be located geographically remotely from other components. Furthermore, one or more of the components may be combined, and additional components performing the functions described herein may be included in the first carrier computer system.

Figures in the present application are block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s).

These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For instance, the destination delivery unit 17 could be any formal or informal, transfer location at which the second carrier is willing to take over delivery of a package to its final destination. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for tracking a parcel being transported by multiple carriers, the method comprising:
   receiving, via a second carrier computing system, a notification from a first carrier computing system that a parcel has been delivered by a first carrier to a transfer location for transfer of the parcel to a second carrier, wherein:
   (a) delivery of the parcel to a recipient is to be completed by the second carrier in response to determining that the parcel is designated for a delivery destination in a rural area,
   (b) the notification is generated by the first carrier computing system after at least a portion of a multi-carrier shipping label affixed to the exterior of the parcel is electronically read by the first carrier,
   (c) the multi-carrier shipping label comprises at least one of visible human-readable indicia or visible machine-readable indicia of a first carrier-specific tracking number, associated with the first carrier, that is to be used by the first carrier in transporting the parcel through the first carrier's transportation and delivery network,
   (d) the multi-carrier shipping label comprises at least one of visible human-readable indicia or visible machine-readable indicia of a second carrier-specific tracking number, associated with the second carrier, that is to be used by the second carrier in transporting the parcel through the second carrier's transportation and delivery network, the second carrier-specific tracking number differing from said first carrier-specific tracking number, and
   (e) the first carrier-specific tracking number is stored, in a tracking database of the second carrier computing system, in association with the second carrier-specific tracking number so as to generate consolidated tracking information associated with the parcel; and
   updating, via the second carrier computing system, said consolidated tracking information associated with the parcel, stored in the tracking database of the second carrier computing system, to reflect the parcel's presence at the transfer location, said updated consolidated tracking information being independently accessible via each of said first and said second carrier-specific tracking numbers.

2. The method of claim 1 further comprising, after the second carrier transports the parcel to an intermediate location within the second carrier's transportation and delivery network, updating, via the second carrier computing system, the consolidated tracking information associated with the parcel to reflect the parcel's presence at the intermediate location.

3. The method of claim 2 further comprising, after the second carrier transports the parcel to the recipient's location within the second carrier's transportation and delivery network:
electronically reading at least a portion of the multi-carrier shipping label; and
updating, via the second carrier computing system, the consolidated tracking information associated with the parcel to reflect the parcel's presence at the recipient's location.

4. The method of claim 3 further comprising, after the second carrier transports the parcel to the recipient's location within the second carrier's transportation and delivery network, transmitting, to the first carrier computing system, the consolidated tracking information reflecting the parcel's presence at the recipient's location.

5. The method of claim 1, wherein the indicia of the first carrier-specific tracking number associated with the first carrier and indicia of the second carrier-specific tracking number associated with the second carrier are selected from the group consisting of a barcode and a Maxicode.

6. The method of claim 1 further comprising transmitting the consolidated tracking information, via the second carrier computing system, to the recipient of the parcel.

7. The method of claim 1 further comprising pushing the consolidated tracking information from the second carrier computing system to the first carrier computing system.

8. The method of claim 1, further comprising:
determining that the delivery destination is in the rural area in response to determining that the delivery to the delivery destination is not cost-effective for the first carrier based in part on a lack of facilities in the rural area.

9. A non-transitory computer program product for tracking a parcel being transported by multiple carriers, the computer program product comprising:
at least one computer-readable storage medium having computer-readable program code portions stored therein, the computer-readable program code portions comprising:
an executable portion configured to receive a notification from a first carrier computing system that a parcel has been delivered by a first carrier to a transfer location for transfer of the parcel to a second carrier, wherein:
(a) delivery of the parcel to a recipient is to be completed by the second carrier in response to determining that the parcel is designated for a delivery destination in a rural area,
(b) the notification is generated by the first carrier computing system after at least a portion of a multi-carrier shipping label affixed to the exterior of the parcel is electronically read by the first carrier,
(c) the multi-carrier shipping label comprises at least one of visible human-readable indicia or visible machine-readable indicia of a first carrier-specific tracking number, associated with the first carrier, that is to be used by the first carrier in transporting the parcel through the first carrier's transportation and delivery network,
(d) the multi-carrier shipping label comprises at least one of visible human-readable indicia or visible machine-readable indicia of a second carrier-specific tracking number, associated with the second carrier, that is to be used by the second carrier in transporting the parcel through the second carrier's transportation and delivery network, the second carrier-specific tracking number differing from said first carrier-specific tracking number, and
(e) the first carrier-specific tracking number is stored, in a tracking database of the second carrier, in association with the second carrier-specific tracking number so as to generate consolidated tracking information associated with the parcel; and
an executable portion configured to update said consolidated tracking information associated with the parcel, stored in the tracking database of the second carrier, to reflect the parcel's presence at the transfer location, said updated consolidated tracking information being independently accessible via each of said first and said second carrier-specific tracking numbers.

10. The non-transitory computer program product of claim 9 further comprising an executable portion configured to, after the second carrier transports the parcel to an intermediate location within the second carrier's transportation and delivery network, update the consolidated tracking information associated with the parcel to reflect the parcel's presence at the intermediate location.

11. The non-transitory computer program product of claim 10 further comprising an executable portion configured to, after the second carrier transports the parcel to the recipient's location within the second carrier's transportation and delivery network, update the consolidated tracking information associated with the parcel to reflect the parcel's presence at the recipient's location.

12. The non-transitory computer program product of claim 11 further comprising an executable portion configured to transmit, to the first carrier computing system, the consolidated tracking information reflecting the parcel's presence at the recipient's location.

13. The non-transitory computer program product of claim 9, wherein the indicia of the first carrier-specific tracking number associated with the first carrier and indicia of the second carrier-specific tracking number associated with the second carrier are selected from the group consisting of a barcode and a Maxicode.

14. The non-transitory computer program product of claim 9 further comprising an executable portion configured to provide the consolidated tracking information to the recipient of the parcel.

15. The non-transitory computer program product of claim 9 further comprising an executable portion configured to push the consolidated tracking information to the first carrier computing system.

16. The non-transitory computer program product of claim 9, further comprising:
an executable portion configured to determine that the delivery destination is in the rural area in response to determining that the delivery to the delivery destination is not cost-effective for the first carrier based in part on a lack of facilities in the rural area.

17. An apparatus comprising:
at least one processor and at least one memory including computer program code, the at least one memory and the computer program code configured to, with the processor, cause the apparatus to at least:
receive a notification from a first carrier computing system that a parcel has been delivered by a first carrier to a transfer location for transfer of the parcel to a second carrier, wherein:

(a) delivery of the parcel to a recipient is to be completed by the second carrier in response to determining that the parcel is designated for a delivery destination in a rural area, (b) the notification is generated by the first carrier computing system after at least a portion of a multi-carrier shipping label affixed to the exterior of the parcel is electronically read by the first carrier, (c) the multi-carrier shipping label comprises at least one of visible human-readable indicia or visible machine-readable indicia of a first carrier-specific tracking number, associated with the first carrier, that is to be used by the first carrier in transporting the parcel through the first carrier's transportation and delivery network, (d) the multi-carrier shipping label comprises at least one of visible human-readable indicia or visible machine-readable indicia of a second carrier-specific tracking number, associated with the second carrier, that is to be used by the second carrier in transporting the parcel through the second carrier's transportation and delivery network, the second carrier-specific tracking number differing from said first carrier-specific tracking number, and (e) the first carrier-specific tracking number is stored, in a tracking database of the second carrier, in association with the second carrier-specific tracking number so as to generate consolidated tracking information associated with the parcel; and update said consolidated tracking information associated with the parcel, stored in the tracking database of the second carrier, to reflect the parcel's presence at the transfer location, said updated consolidated tracking information being independently accessible via each of said first and said second carrier-specific tracking numbers.

18. The apparatus of claim 17, wherein the memory and computer program code are further configured to, with the processor, cause the apparatus to, after the second carrier transports the parcel to an intermediate location within the second carrier's transportation and delivery network, update the consolidated tracking information associated with the parcel to reflect the parcel's presence at the intermediate location.

19. The apparatus of claim 18, wherein the memory and computer program code are further configured to, with the processor, cause the apparatus to, after the second carrier transports the parcel to the recipient's location within the second carrier's transportation and delivery network, update the consolidated tracking information associated with the parcel to reflect the parcel's presence at the recipient's location.

20. The apparatus of claim 19, wherein the memory and computer program code are further configured to, with the processor, cause the apparatus to transmit, to the first carrier computing system, the consolidated tracking information reflecting the parcel's presence at the recipient's location.

21. The apparatus of claim 17, wherein the indicia of the first carrier-specific tracking number associated with the first carrier and indicia of the second carrier-specific tracking number associated with the second carrier are selected from the group consisting of a barcode and a Maxicode.

22. The apparatus of claim 17, wherein the memory and computer program code are further configured to, with the processor, cause the apparatus to provide the consolidated tracking information to the recipient of the parcel.

23. The apparatus of claim 17, wherein the memory and computer program code are further configured to, with the processor, cause the apparatus to push the consolidated tracking information to the first carrier computing system.

24. The apparatus of claim 17, wherein the memory and computer program code are further configured to, with the processor, cause the apparatus to:

determine that the delivery destination is in the rural area in response to determining that the delivery to the delivery destination is not cost-effective for the first carrier based in part on a lack of facilities in the rural area.

* * * * *